(12) United States Patent
Zhang et al.

(10) Patent No.: US 12,530,742 B2
(45) Date of Patent: Jan. 20, 2026

(54) METHODS AND APPARATUS TO SYNTHESIZE SIX DEGREE-OF-FREEDOM VIEWS FROM SPARSE RGB-DEPTH INPUTS

(71) Applicant: Intel Corporation, Santa Clara, CA (US)

(72) Inventors: Fan Zhang, San Mateo, CA (US); Oscar Nestares, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 972 days.

(21) Appl. No.: 17/483,635

(22) Filed: Sep. 23, 2021

(65) Prior Publication Data

US 2022/0012860 A1 Jan. 13, 2022

(51) Int. Cl.
*G06T 5/50* (2006.01)
*G06T 5/77* (2024.01)

(52) U.S. Cl.
CPC ............. *G06T 5/50* (2013.01); *G06T 5/77* (2024.01); *G06T 2207/10024* (2013.01); *G06T 2207/10028* (2013.01); *G06T 2207/20081* (2013.01); *G06T 2207/20084* (2013.01); *G06T 2207/20221* (2013.01)

(58) Field of Classification Search
CPC ... G06T 5/50; G06T 5/77; G06T 2207/10024; G06T 2207/10028; G06T 2207/20081; G06T 2207/20084; G06T 2207/20221; G06T 5/60
See application file for complete search history.

(56) References Cited

U.S. PATENT DOCUMENTS 11,049,277 B1 6/2021 Price et al.
11,403,800 B1 * 8/2022 Prokudin ............... G06V 10/82
(Continued)

FOREIGN PATENT DOCUMENTS

CN 112927279 A 6/2021
WO 2019173672 A1 9/2019

OTHER PUBLICATIONS

International Bureau, "International Preliminary Report on Patentability," issued in connection with International Patent Application No. PCT/US2022/043242, mailed Apr. 4, 2024, 5 pages.
(Continued)

*Primary Examiner* — Chan S Park
*Assistant Examiner* — Daniel C Chang
(74) *Attorney, Agent, or Firm* — Hanley, Flight & Zimmerman, LLC

(57) ABSTRACT

Methods and apparatus are disclosed herein to synthesize six degree-of-freedom views from sparce RGB-depth inputs. An example apparatus includes at least one memory, instructions in the apparatus, and processor circuitry to execute the instructions to reproject a first red-green-blue (RGB) depth view and a second RGB depth view to a target camera position to obtain a first reprojected view and a second reprojected view, combine the first reprojected view and the second reprojected view into a blended view data based on a first weight map and a second weight map, the blended view including missing RGB depth information due to at least one of an occlusion or a disocclusion, and generate a six degree-of-freedom synthesized view of the blended view data, the synthesized view including the missing RGB depth information.

15 Claims, 18 Drawing Sheets

(56) References Cited

U.S. PATENT DOCUMENTS

| | | | |
|---|---|---|---|
| 2019/0304164 A1* | 10/2019 | Zhang | G06T 1/20 |
| 2020/0302688 A1 | 9/2020 | Hosfield et al. | |
| 2021/0375044 A1 | 12/2021 | George | |
| 2022/0005152 A1* | 1/2022 | Yun | G06T 5/50 |
| 2022/0398705 A1* | 12/2022 | Martin Brualla | G06T 3/18 |

OTHER PUBLICATIONS

Peter Hedman et al., "Deep Blending for Free-Viewpoint Image-Based Rendering," ACM Transactions on Graphics, vol. 37, Issue 6, Article 257, pp. 1-15, Dec. 4, 2018. pp. 1-11; and Figures 1-16.

International Searching Authority, "Written Opinion of the International Searching Authority," issued in connection with International Patent Application No. PCT/US2022/043242, mailed Dec. 28, 2022, 3 Pages.

International Searching Authority, "International Search Report," issued in connection with International Patent Application No. PCT/US2022/043242, dated Dec. 28, 2022, 4 Pages.

\* cited by examiner

METHODS AND APPARATUS TO SYNTHESIZE SIX DEGREE-OF-FREEDOM VIEWS FROM SPARSE RGB-DEPTH INPUTS

FIELD OF THE DISCLOSURE

This disclosure relates generally to computing systems, and, more particularly, to methods and apparatus to synthesize six degree-of-freedom views from sparce RGB-depth inputs.

BACKGROUND

Deep neural networks (DNNs) have revolutionized the field of artificial intelligence (AI) with state-of-the-art results in many domains including computer vision, speech processing, and natural language processing. DNN-based learning algorithms can be focused on how to efficiently execute already trained models (e.g., using inference) and how to evaluate DNN computational efficiency via image classification. Improvements in efficient training of DNN models can be useful in areas of machine translation, speech recognition, and recommendation systems, among others.

Figure 1:
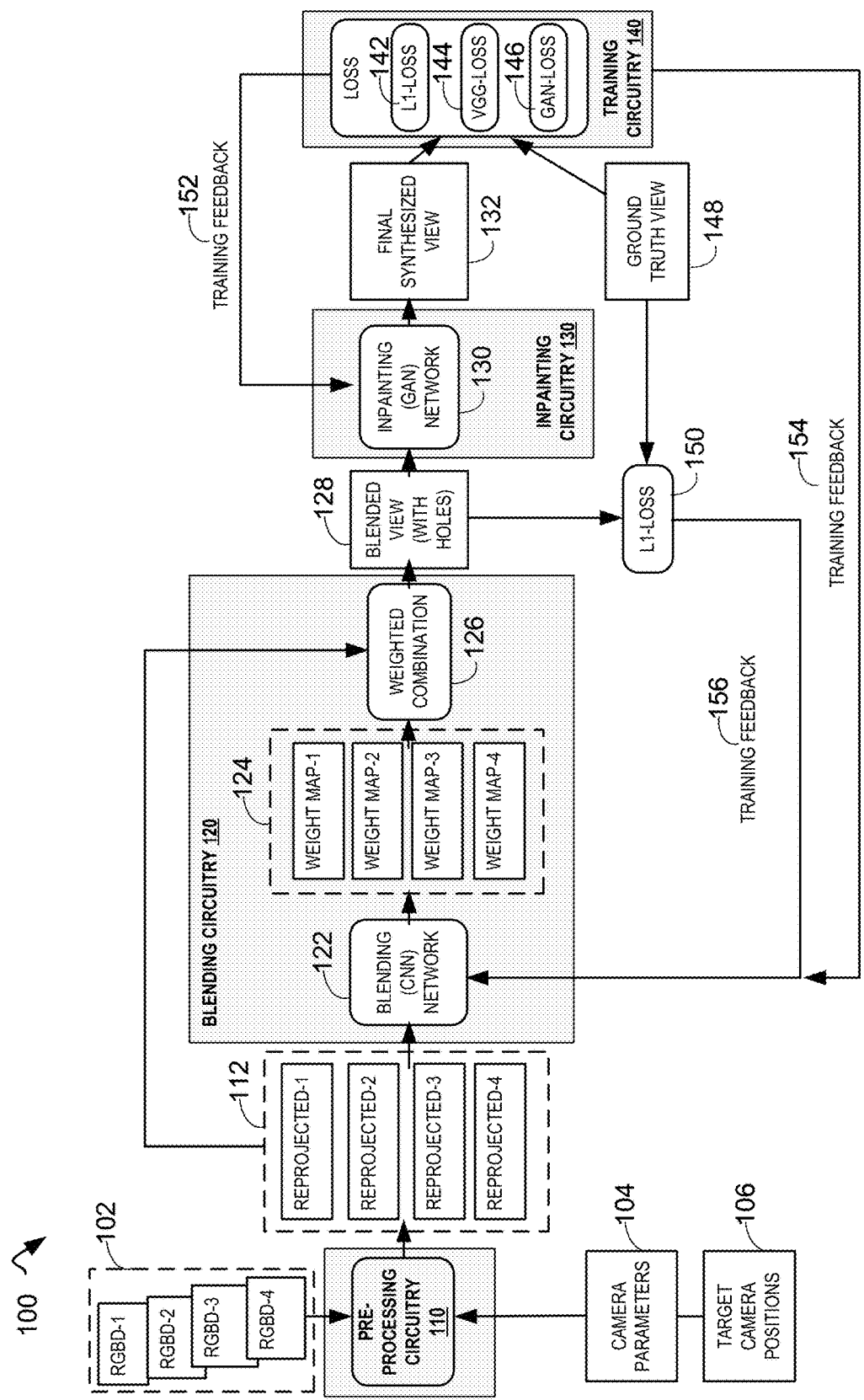
FIG. 1 illustrates an example convolutional end-to-end deep learning network to synthesize six degree-of-freedom (DOF) novel views from sparse RGB-depth inputs using pre-processing circuitry, blending circuitry, inpainting circuitry, and/or training circuitry.

The figures are not to scale. In general, the same reference numbers will be used throughout the drawing(s) and accompanying written description to refer to the same or like parts. Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Deep neural networks (DNNs) have revolutionized the field of artificial intelligence (AI) with state-of-the-art results in many domains including computer vision, speech processing, and natural language processing. More specifically, neural networks are used in machine learning to allow a computer to learn to perform certain tasks by analyzing training examples. For example, an object recognition system can be fed numerous labeled images of objects (e.g., cars, trains, animals, etc.) to allow the system to identify visual patterns in such images that consistently correlate with a particular object label. DNNs rely on multiple layers to progressively extract higher-level features from raw data input (e.g., from identifying edges of a human being using lower layers to identifying actual facial features using higher layers, etc.). In some examples, neural networks can be used for immersive virtual reality applications. While the use of 360° video allows for the presentation of views that are consistent with a rotation of a viewer's head along three axes, translations in x, y, and z directions with support of six degrees-of-freedom (6 DOF) can provide an improvement in immersive video applications using three translational degrees of freedom and/or three rotational degrees of freedom. For example, a first translational DOF allows for forward and/or backward movement along the x-axis, with a corresponding first rotational DOF for tilting on the same axis. A second translational DOF allows for side-to-side movement (e.g., movement to the left or right of an object along the y-axis), with a corresponding second rotational DOF providing an ability to twist on the same axis. A third translational DOF allows for lower or higher views (e.g., movement higher than an object or lower than an object along the z-axis), with a corresponding third rotational DOF to allow for tipping on the same axis (e.g., upward or downward viewing).

Two common categories of 6 DOF content generation techniques include (1) geometry reconstruction-based methods and (2) image-based rendering methods. Image-based rendering techniques can offer fast runtime performance and can handle challenging scenarios that 3D reconstruction may fail to process. In some examples, traditional 3D geometry reconstruction techniques estimate 3D models using multi-view geometry information from the captured unstructured photo datasets. Advanced patch match-based reconstruction algorithms can manage to largely improve the 3D model accuracy, while image-based rendering solutions synthesize novel views by using advanced reprojection and blending algorithms without constructing any sophisticated 3D models for the scenes. Additionally, various deep learning-based methods have been proposed to use convolutional neutral networks to synthesize novel views from sparse captured content.

However, several disadvantages exist with using such 6 DOF content generation techniques. For example, geometry reconstruction-based solutions usually generate 3D models with insufficient accuracy and thereby fail to produce realistic synthesis results. Additionally, 3D model reconstruction is time-consuming and cannot be used for applications with certain runtime performance requirements. Although traditional image-based rendering techniques do not construct sophisticated 3D models, many of such techniques still rely on a global sparse 3D model. Therefore, the realism of such image-rending techniques is limited by the accuracy of the sparse model. Meanwhile, known deep learning-based methods can produce novel synthesis results with significantly improved quality. However, such methods include hard constraints for camera baselines such that disparity values of the input content can be stayed within a range, with limited capabilities to support 6 DOF free view synthesis. While some known techniques overcome the limitations of the general deep learning solutions and allow large space free viewpoint rendering for realistic novel content generation, such novel view synthesis methods are decoupled into several modules with blending steps limited to the deep neutral network and do not provide an end-to-end solution.

Methods and apparatus disclosed herein synthesize 6 DOF views from sparse Red Green Blue (RGB)-depth inputs. For example, methods and apparatus disclosed herein use a deep learning, 6 DOF image-based rendering method for novel view synthesis. In the examples disclosed herein, four sparse RGB-depth (RGBD) inputs and an arbitrary target position are used as inputs to generate a novel virtual view as if the view was captured from the target location. In some examples, the deep neutral network (DNN) is a fully convolutional end-to-end network without separate preprocessing or postprocessing modules. As such, in contrast to known light field generation networks that can only handle limited viewpoint changes, the DNN disclosed herein can generate novel viewpoints in a large space. For example, in the methods and apparatus disclosed herein, a fully convolutional end-to-end deep learning network can be used to synthesize 6 DOF novel views from sparse RGBD inputs. For example, given four RGBD inputs and an arbitrary virtual target position, methods and apparatus disclosed herein reproject the four RGB inputs to the target virtual position according to camera parameters and/or depth maps. In some examples, the reprojected views are input into a blending network to generate a blended view with missing data. In some examples, an inpainting network can be used to fill the missing data of the blended view and generate the final novel views, thereby generating 6 DOF novel views in a large space with very sparse inputs. Methods and apparatus disclosed herein can be used to generate light field content for immersive virtual reality applications. In some examples, methods and apparatus disclosed herein can be used for real-time 6 DOF content generation applications after deep learning inference-based acceleration (e.g., using tensorRT).

FIG. 1 illustrates an example convolutional end-to-end deep learning network 100 to synthesize six degree-of-freedom (DOF) novel views from sparse RGB-depth inputs using pre-processing circuitry, blending circuitry, inpainting circuitry, and/or training circuitry. In the example of FIG. 1, the deep learning network includes example pre-processing circuitry 110, example blending circuitry 120, example inpainting circuitry 130, and example training circuitry 140.

In the example of FIG. 1, the pre-processing circuitry 110 receives inputs that can include example RGB-depth (RGBD) input(s) 102, example camera parameter(s) input 104, and/or example target camera position(s) input 106. In some examples, the RGBD input(s) 102 include RGBD inputs taken from different angles. In some examples, the RGBD input(s) 102 are obtained from RGBD sensors (e.g., associated with depth-sensing devices) that work in association with an RGB (red, green, and blue color) sensor camera(s). For example, RGBD sensors augment conventional images with depth information (e.g., associated with a distance between an object and the sensor) in a per-pixel basis. In some examples, the camera parameter(s) input 104 includes camera intrinsic parameters (e.g., parameters used to link pixel coordinates of an image point with corresponding coordinates in a camera reference frame) and/or camera extrinsic parameters (e.g., relative rotation and/or translation between cameras to identify depth estimation and structure from motion). The target camera position(s) input 106 provides coordinates of a target position from which the convolutional end-to-end deep learning network 100 synthesizes a virtual novel view as if the view was taken from the target location.

In the example of FIG. 1, the preprocessing circuitry 110 outputs reprojected views 112 of the original RGBD input(s) 102, as described in connection with FIGS. 2 and 4. For example, input images 102 are reprojected to the target position (e.g., obtained based on target camera position(s) input 106), providing the reprojected views 112. The blending circuitry 120 blends the reprojected views 112 using example weight map(s) 124 to generate an example weighted combination 126. For example, the blending circuitry 120 estimates the weight maps 124 used for combining the reprojected views 112 based on an example weighted combination 126 of the reprojected views 112 to obtain an example blended view 128, as described in connection with FIGS. 2 and 5. The blending circuitry 120 can include a convolutional neural network (CNN). In the example of a convolutional neural network, a two-dimensional image and/or a class of the image can serve as input for the neural network training circuitry 140. As a result of the training, trained weights are obtained, representing data patterns or rules extracted from the input images. In some examples, an image can serve as an only input passed to a trained model, such that the trained model outputs the class of the image based on the learned data patterns acquired by the CNN during training using the neural network training circuitry 140.

In some examples, the blended view 128 includes missing data due to occlusion/disocclusion in the original RGBD input(s) 102. In FIG. 1, the inpainting circuitry 130 receives the blended view 128 input for further processing to fill missing data of the blended view 128 and complete the target virtual view by analyzing and/or using neighborhood information associated with the missing data of the reprojected views 112, as described in connection with FIGS. 3 and 6. The inpainting circuitry 130 thereby yields an example final synthesized view 132 which can be output to a user and/or used for training purposes as part of the training circuitry 140. In some examples, the inpainting circuitry 130 includes a generative adversarial network (GAN). This neural network can be used in unsupervised task learning involving automatically discovering and/or learning regularities and/or patterns in input data in such a way as to allow the model to generate and/or output new examples that could have been drawn from the original dataset.

The training circuitry 140 includes the use of a loss function, including example L1 loss 142, example VGG loss 144, and/or example GAN loss 146. In some examples, the training circuitry 140 reduces neural network training-based errors by fitting a function on a given training set. In some examples, the training circuitry 140 can be used to avoid overfitting. For example, the training circuitry 140 can include a penalty term in an error function to control fluctuation and lack of proper fitting. This can be relevant when models perform well on a training set but shown inaccuracies when a test set is used (e.g., a set of images that the model has not encountered during training). In some examples, the training circuitry 140 can reduce the burden on a specific set of model weights to control model complexity. For example, images with many features inherently include many weights, making the model prone to overfitting. The training circuitry 140 reduces the impact of given weights on the loss function used to determine errors between actual labels and predicted labels. In some examples, the training circuitry 140 can include regularization techniques based on L1 regularization to introduce the L1 loss 142 (e.g., where L1 regularization gives outputs in binary weights from 0 to 1 for a model's features and can be adopted for decreasing the total number of features in a large dimensional dataset). However, any other type of regularization can be used. The regularization term reduces the value of certain weights to allow for model simplification, thereby reducing overfitting. Similarly, VGG loss introduces a content loss that provides an alternative to pixel-wise losses, thereby attempting to improve perceptual similarity. In some examples, VGG loss is based on rectified linear unit (ReLU) activation layers of a pre-trained VGG network. For example, ReLUs are piecewise linear functions that output the input directly when the input is positive. Use of ReLUs permits improvement in overall model learning and performance. The training circuitry 140 can further include the GAN loss 146. In some examples, the GAN loss 146 can be used to reflect the distance between the distribution of data generated by the GAN and the distribution of the real data input (e.g., represented by example ground truth data 148). In the example of FIG. 1, the ground truth data 148 can be provided to the training circuitry 140 and/or for the calculation of example L1 loss 150. The output of the training circuitry 140 can further be used to provide training feedback 152, 154, 156 to the blending circuitry 120 (e.g., using a CNN to perform blending) and/or the inpainting circuitry 130 (e.g., using a GAN to perform inpainting). In some examples, the training circuitry 140 trains the convolutional neural network and the generative adversarial network simultaneously and/or jointly.

Figure 2:
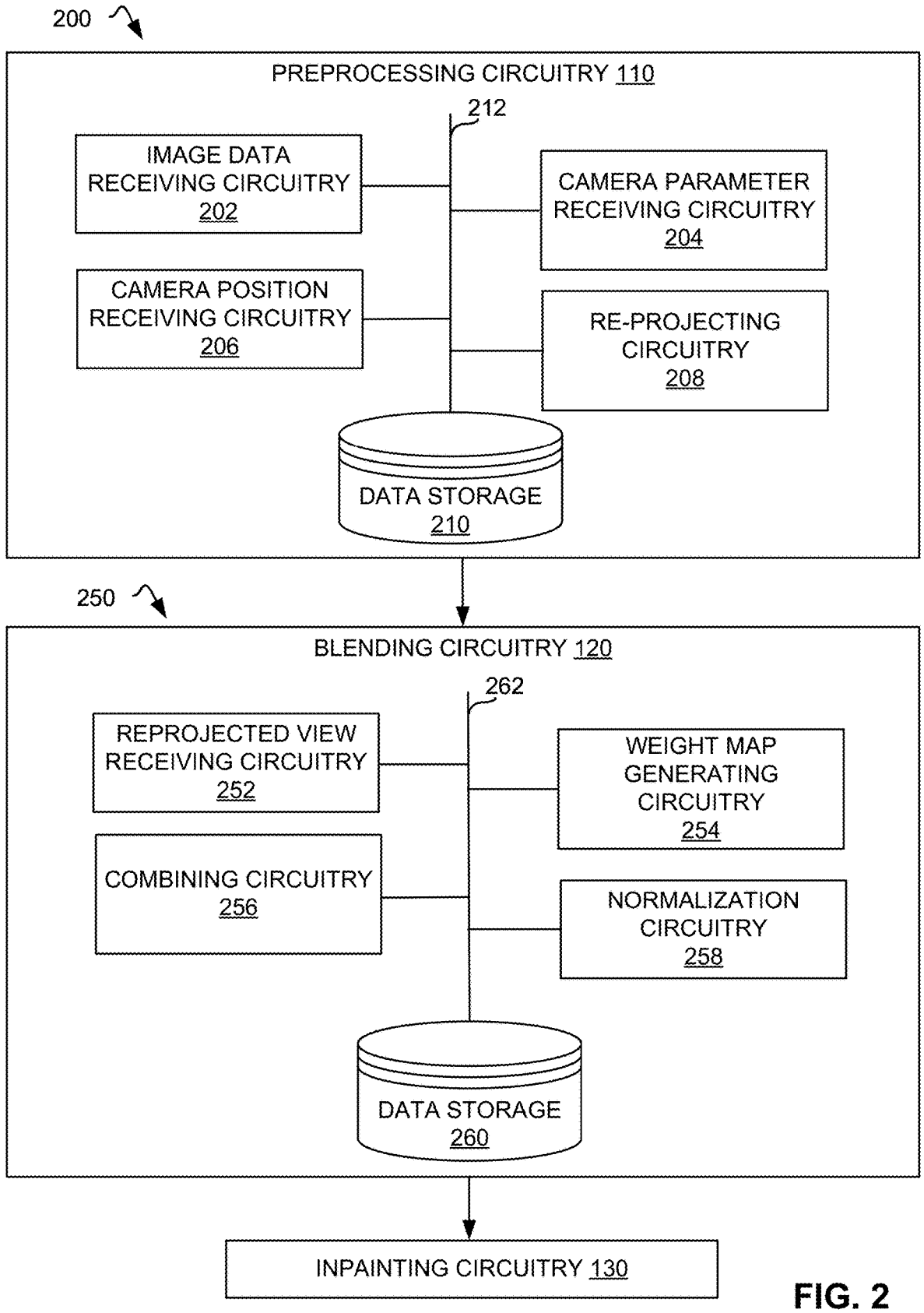
FIG. 2 illustrates a block diagram of the preprocessing circuitry and the blending circuitry of FIG. 1 constructed in accordance with teachings of this disclosure.

FIG. 2 illustrates block diagrams 200, 250 of the preprocessing circuitry 110 and the blending circuitry 120 of FIG. 1 constructed in accordance with teachings of this disclosure. The preprocessing circuitry 110 includes example image data receiving circuitry 202, example camera parameter receiving circuitry 204, example camera position receiving circuitry 206, example re-projecting circuitry 208, and/or example data storage 210. The image data receiving circuitry 202, the camera parameter receiving circuitry 204, the camera position receiving circuitry 206, the re-projecting circuitry 208, and/or the data storage 210 are in communication using example bus 212.

The image data receiving circuitry 202 receives image data such as data associated with RGBD views (e.g., RGBD inputs 102 of FIG. 1). In some examples, the RGBD inputs 102 include views of an object from different angles. The image data receiving circuitry 202 processes the RGBD inputs 102 for use in the preprocessing circuitry 110 as part of generating reprojected views associated with the RGBD inputs 102. The camera parameter receiving circuitry 204 receives camera parameter-based inputs (e.g., camera parameter input 104 of FIG. 1). In some examples, the parameter receiving circuitry 204 receives intrinsic camera parameter input (e.g., parameters used to link pixel coordinates of an image point with corresponding coordinates in a camera reference frame) and/or extrinsic camera parameter input (e.g., relative rotation and/or translation between cameras to identify depth estimation and structure from motion). The camera position receiving circuitry 206 receives camera position information, including the target camera positions input 106 of FIG. 1. For example, reprojected views can be generated based on the input target camera position to allow a virtual view to be reconstructed based on the intended target position (e.g., using RGB pixel remapping). As such, the input images can be reprojected to the target position. The re-projecting circuitry 208 reprojects the input RGBD views to the target position provided by the target camera positions input 106. For example, the reprojected views are focused on the target camera position, with the RGBD views that were initially provided to the preprocessing circuitry 110 reprojected to yield the same number of reprojected views, as shown in the example of FIG. 1. The data storage 210 can be used to store any information associated with the image data receiving circuitry 202, the camera parameter receiving circuitry 204, the camera position receiving circuitry 206, and/or the re-projecting circuitry 208. The example data storage 210 of the illustrated example of FIG. 2 can be implemented by any memory, storage device and/or storage disc for storing data such as flash memory, magnetic media, optical media, etc. Furthermore, the data stored in the example data storage 210 can be in any data format such as binary data, comma delimited data, tab delimited data, structured query language (SQL) structures, image data, etc.

The blending circuitry 120 includes example reprojected view receiving circuitry 252, example weight map generating circuitry 254, example combining circuitry 256, example normalization circuitry 256, and/or example data storage 260. The reprojected view receiving circuitry 252, the weight map generating circuitry 254, the combining circuitry 256, the normalization circuitry 256, and/or the data storage 260 are in communication using example bus 262.

The reprojected view receiving circuitry 252 receives the reprojected view output generated by the preprocessing circuitry 110. The weight map generating circuitry 254 generates one or more weight map(s) as part of a convolutional neural network. For example, weight maps can be learned to combine them with the reprojected views to obtain a blended view. In some examples, the weight map generating circuitry 254 restricts the output parameter value ranges to [0,1] for the weight map. The combining circuitry 256 combines the weight map(s) and the reprojected views to obtain a weighted combination. The normalization circuitry 256 follows convolutional layer(s) of the network with a group normalization and a leaky rectified linear unit (ReLU). In some examples, the normalization circuitry 258 follows the last convolutional layer of the network with a group normalization and/or sigmoid unit to restrict the output parameter value ranges for a given weight map. The data storage 260 can be used to store any information associated with the reprojected view receiving circuitry 252, the weight map generating circuitry 254, the combining circuitry 256, and/or the normalization circuitry 256. The example data storage 260 of the illustrated example of FIG. 2 can be implemented by any memory, storage device and/or storage disc for storing data such as flash memory, magnetic media, optical media, etc. Furthermore, the data stored in the example data storage 260 can be in any data format such as binary data, comma delimited data, tab delimited data, structured query language (SQL) structures, image data, etc.

Figure 3:
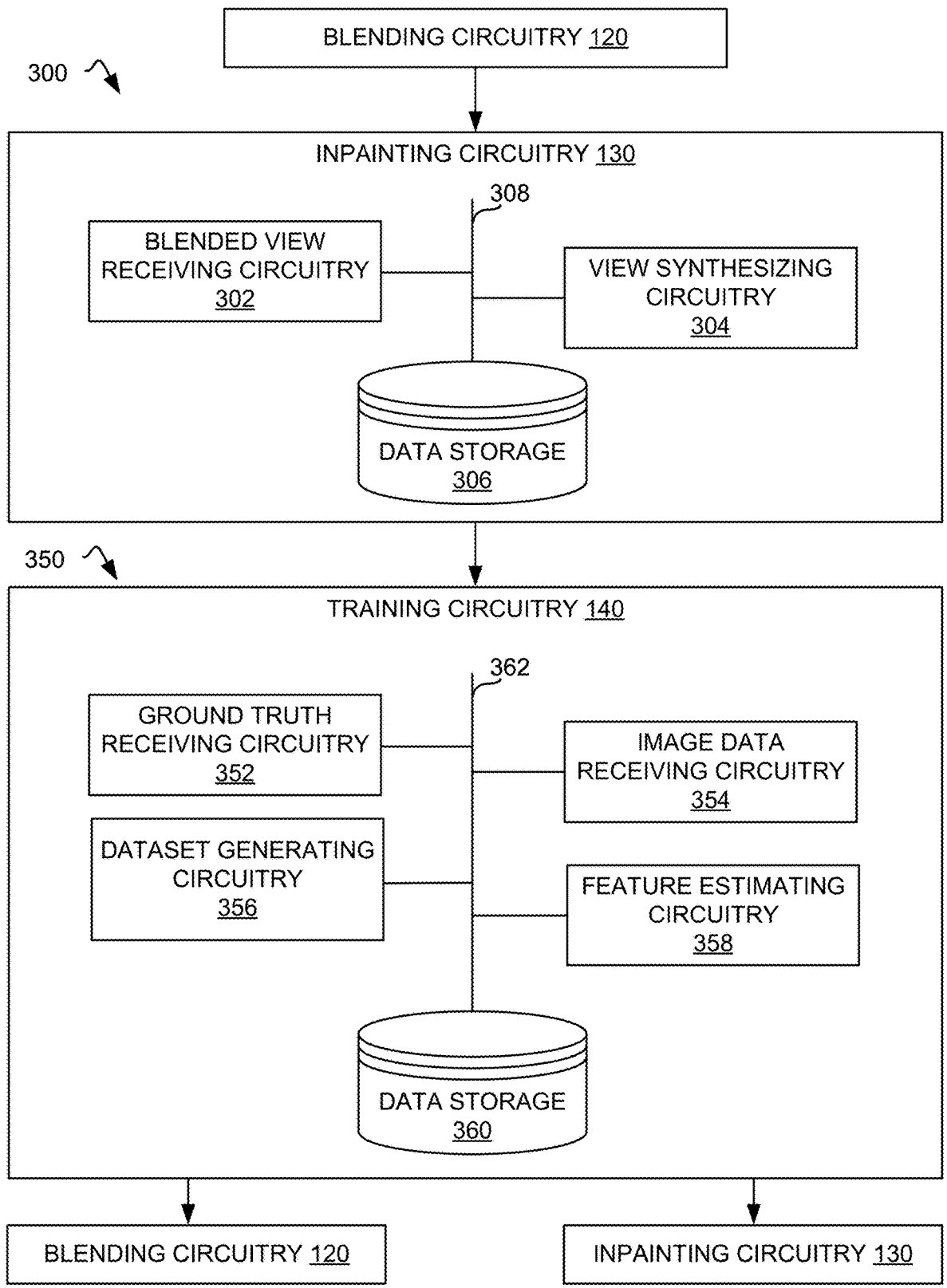
FIG. 3 illustrates a block diagram of the inpainting circuitry and the training circuitry of FIG. 2 constructed in accordance with teachings of this disclosure.

FIG. 3 illustrates block diagrams 300, 350 of the inpainting circuitry 130 and the training circuitry 140 of FIG. 2 constructed in accordance with teachings of this disclosure. The inpainting circuitry 130 includes example blended view receiving circuitry 302, example view synthesizing circuitry 304, and/or example data storage 306. The blended view receiving circuitry 302, the view synthesizing circuitry 304, and/or the data storage 306 are in communication using example bus 308.

The blended view receiving circuitry 302 receives the blended view generated by the blending circuitry 120. Once the blended view is received, the view synthesizing circuitry 304 synthesizes the final view to fill any missing data present in the original blended images (e.g., as a result occlusion/disocclusion in the original inputs). In some examples, the view synthesizing circuitry 304 includes a generative adversarial network (GAN). The view synthesizing circuitry 304 uses the GAN to complete the regions missing RGB information by analyzing and using their neighborhood content. For example, the view synthesizing circuitry 304 receives input from the training circuitry 140, where for each RGB image, feature correspondences can be estimated between a current RGB image and the remaining images of a given scene, with neighbors of the RGB image associated with feature correspondence numbers. Training feedback received from the training circuitry 140 can be used to enhance the accuracy of final view synthesis. The data storage 306 can be used to store any information associated with the blended view receiving circuitry 302 and/or the view synthesizing circuitry 304. The example data storage 306 of the illustrated example of FIG. 3 can be implemented by any memory, storage device and/or storage disc for storing data such as flash memory, magnetic media, optical media, etc. Furthermore, the data stored in the example data storage 306 can be in any data format such as binary data, comma delimited data, tab delimited data, structured query language (SQL) structures, image data, etc.

The training circuitry 140 includes example ground truth receiving circuitry 352, example image data receiving circuitry 354, example dataset generating circuitry 356, example feature estimating circuitry 358, and/or example data storage 360. The ground truth receiving circuitry 352, the image data receiving circuitry 354, the dataset generating circuitry 356, the feature estimating circuitry 358, and/or the data storage 360 are in communication using example bus 362.

The ground truth receiving circuitry 352 receives ground truth data (e.g., ground truth view 148) that corresponds to the real image associated with the final intended synthesized image (e.g., final synthesized view 132) based on the original target camera position input 106. The ground truth information received by the ground truth receiving circuitry 352 can be used in the training of the blending circuitry 120 neural network and/or the inpainting circuitry 130 neural network. The image data receiving circuitry 354 receives the final synthesized view(s) from the inpainting circuitry 130 (e.g., final synthesized view 132) and/or the blended view(s) from the blending circuitry 120. The dataset generating circuitry 356 generates a dataset for view synthesis training based on sparse indoor and/or outdoor RGB environment captures. For example, the dataset generating circuitry 356 identifies camera intrinsic parameters, rotation/translation matrices, and/or depth maps for each image to create a view synthesis including input views and/or the reconstructed novel view. Additionally, the dataset generating circuitry 356 can use a current RGB image as the ground truth while randomly choosing neighbor images from a neighbor list as the input views. In some examples, the dataset generating circuitry 356 constructs a training datapoint using rotation/translation matrices of a current RGB image as the target position. The feature estimating circuitry 358 estimates feature correspondences between a current RGB image and the rest of the images in a given scene. For example, the feature estimating circuitry 358 identifies neighboring views of a given image based on associated feature correspondence numbers. The data storage 360 can be used to store any information associated with the ground truth receiving circuitry 352, the image data receiving circuitry 354, the dataset generating circuitry 356, and/or the feature estimating circuitry 358. The example data storage 360 of the illustrated example of FIG. 3 can be implemented by any memory, storage device and/or storage disc for storing data such as flash memory, magnetic media, optical media, etc. Furthermore, the data stored in the example data storage 360 can be in any data format such as binary data, comma delimited data, tab delimited data, structured query language (SQL) structures, image data, etc.

In some examples, the apparatus includes means for reprojecting a first red-green-blue (RGB) depth view and a second RGB depth view. For example, the means for reprojecting may be implemented by preprocessing circuitry 110. In some examples, the preprocessing circuitry 110 may be implemented by machine executable instructions such as that implemented by at least blocks 408, 410 of FIG. 4 executed by processor circuitry, which may be implemented by the example processor circuitry 1212 of FIG. 12, the example processor circuitry 1600 of FIG. 16, and/or the example Field Programmable Gate Array (FPGA) circuitry 1700 of FIG. 17. In other examples, the preprocessing circuitry 110 is implemented by other hardware logic circuitry, hardware implemented state machines, and/or any other combination of hardware, software, and/or firmware. For example, the preprocessing circuitry 110 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the apparatus includes means for combining the first reprojected view and the second reprojected view. For example, the means for combining may be implemented by blending circuitry 120. In some examples, the blending circuitry 120 may be implemented by machine executable instructions such as that implemented by at least blocks 502, 504, 506, 508 of FIG. 5 executed by processor circuitry, which may be implemented by the example processor circuitry 1312 of FIG. 13, the example processor circuitry 1600 of FIG. 16, and/or the example Field Programmable Gate Array (FPGA) circuitry 1700 of FIG. 17. In other examples, the blending circuitry 120 is implemented by other hardware logic circuitry, hardware implemented state machines, and/or any other combination of hardware, software, and/or firmware. For example, the blending circuitry 120 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the apparatus includes means for generating a six degree-of-freedom synthesized view of the blended view data. For example, the means for generating may be implemented by inpainting circuitry 130. In some examples, the inpainting circuitry 130 may be implemented by machine executable instructions such as that implemented by at least blocks 602, 604, 606 of FIG. 6 executed by processor circuitry, which may be implemented by the example processor circuitry 1412 of FIG. 14, the example processor circuitry 1600 of FIG. 16, and/or the example Field Programmable Gate Array (FPGA) circuitry 1700 of FIG. 17. In other examples, the inpainting circuitry 130 is implemented by other hardware logic circuitry, hardware implemented state machines, and/or any other combination of hardware, software, and/or firmware. For example, the inpainting circuitry 130 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the apparatus includes means for training a first neural network and/or a second neural network. For example, the means for training may be implemented by training circuitry 140. In some examples, the training circuitry 140 may be implemented by machine executable instructions such as that implemented by at least blocks 702, 704, 706, 708, 710, 712, 714 of FIG. 7 executed by processor circuitry, which may be implemented by the example processor circuitry 1512 of FIG. 15, the example processor circuitry 1600 of FIG. 16, and/or the example Field Programmable Gate Array (FPGA) circuitry 1700 of FIG. 17. In other examples, the training circuitry 140 is implemented by other hardware logic circuitry, hardware implemented state machines, and/or any other combination of hardware, software, and/or firmware. For example, the training circuitry 140 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the preprocessing circuitry 110 of FIG. 1 is illustrated in FIG. 2, one or more of the elements, processes, and/or devices illustrated in FIG. 2 may be combined, divided, re-arranged, omitted, eliminated, and/or implemented in any other way. Further, the example image data receiving circuitry 202, the example camera parameter receiving circuitry 204, the example camera position receiving circuitry 206, the example re-projecting circuitry, and/or, more generally, the example preprocessing circuitry 110 of FIG. 2, may be implemented by hardware, software, firmware, and/or any combination of hardware, software, and/or firmware. Thus, for example, any of the example image data receiving circuitry 202, the example camera parameter receiving circuitry 204, the example camera position receiving circuitry 206, the example re-projecting circuitry, and/or, more generally, the example preprocessing circuitry 110 of FIG. 2, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example image data receiving circuitry 202, the example camera parameter receiving circuitry 204, the example camera position receiving circuitry 206, the example re-projecting circuitry, and/or, more generally, the example preprocessing circuitry 110 of FIG. 2 is/are hereby expressly defined to include a non-transitory computer readable storage device or storage disk such as a memory, a digital versatile disk (DVD), a compact disk (CD), a Blu-ray disk, etc., including the software and/or firmware. Further still, the example preprocessing circuitry 110 of FIG. 2 may include one or more elements, processes, and/or devices in addition to, or instead of, those illustrated in FIG. 2, and/or may include more than one of any or all of the illustrated elements, processes and devices.

While an example manner of implementing the blending circuitry 120 of FIG. 1 is illustrated in FIG. 2, one or more of the elements, processes, and/or devices illustrated in FIG. 2 may be combined, divided, re-arranged, omitted, eliminated, and/or implemented in any other way. Further, the example reprojected view receiving circuitry 252, the example weight map generating circuitry 254, the example combining circuitry 256, the example normalization circuitry, and/or, more generally, the example blending circuitry 120 of FIG. 1, may be implemented by hardware, software, firmware, and/or any combination of hardware, software, and/or firmware. Thus, for example, any of the example reprojected view receiving circuitry 252, the example weight map generating circuitry 254, the example combining circuitry 256, the example normalization circuitry, and/or, more generally, the example blending circuitry 120 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example reprojected view receiving circuitry 252, the example weight map generating circuitry 254, the example combining circuitry 256, the example normalization circuitry, and/or, more generally, the example blending circuitry 120 of FIG. 1 is/are hereby expressly defined to include a non-transitory computer readable storage device or storage disk such as a memory, a digital versatile disk (DVD), a compact disk (CD), a Blu-ray disk, etc., including the software and/or firmware. Further still, the example blending circuitry 120 of FIG. 1 may include one or more elements, processes, and/or devices in addition to, or instead of, those illustrated in FIG. 2, and/or may include more than one of any or all of the illustrated elements, processes and devices.

While an example manner of implementing the inpainting circuitry 130 of FIG. 1 is illustrated in FIG. 3, one or more of the elements, processes, and/or devices illustrated in FIG. 3 may be combined, divided, re-arranged, omitted, eliminated, and/or implemented in any other way. Further, the example blended view receiving circuitry 302, the example view synthesizing circuitry 304, and/or, more generally, the example inpainting circuitry 130 of FIG. 1, may be implemented by hardware, software, firmware, and/or any combination of hardware, software, and/or firmware. Thus, for example, any of the example blended view receiving circuitry 302, the example view synthesizing circuitry 304, and/or, more generally, the example inpainting circuitry 130 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example blended view receiving circuitry 302, the example view synthesizing circuitry 304, and/or, more generally, the example inpainting circuitry 130 of FIG. 1 is/are hereby expressly defined to include a non-transitory computer readable storage device or storage disk such as a memory, a digital versatile disk (DVD), a compact disk (CD), a Blu-ray disk, etc., including the software and/or firmware. Further still, the example inpainting circuitry 130 of FIG. 1 may include one or more elements, processes, and/or devices in addition to, or instead of, those illustrated in FIG. 3, and/or may include more than one of any or all of the illustrated elements, processes and devices.

While an example manner of implementing the training circuitry 140 of FIG. 1 is illustrated in FIG. 3, one or more of the elements, processes, and/or devices illustrated in FIG. 3 may be combined, divided, re-arranged, omitted, eliminated, and/or implemented in any other way. Further, the example ground truth receiving circuitry 352, the example image data receiving circuitry 354, the example dataset generating circuitry 356, the example feature estimating circuitry 358, and/or, more generally, the example training circuitry 140 of FIG. 1, may be implemented by hardware, software, firmware, and/or any combination of hardware, software, and/or firmware. Thus, for example, any of the example ground truth receiving circuitry 352, the example image data receiving circuitry 354, the example dataset generating circuitry 356, the example feature estimating circuitry 358, and/or, more generally, the example training circuitry 140 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example ground truth receiving circuitry 352, the example image data receiving circuitry 354, the example dataset generating circuitry 356, the example feature estimating circuitry 358, and/or, more generally, the example training circuitry 140 of FIG. 1 is/are hereby expressly defined to include a non-transitory computer readable storage device or storage disk such as a memory, a digital versatile disk (DVD), a compact disk (CD), a Blu-ray disk, etc., including the software and/or firmware. Further still, the example training circuitry 140 of FIG. 1 may include one or more elements, processes, and/or devices in addition to, or instead of, those illustrated in FIG. 3, and/or may include more than one of any or all of the illustrated elements, processes and devices.

Figure 4:
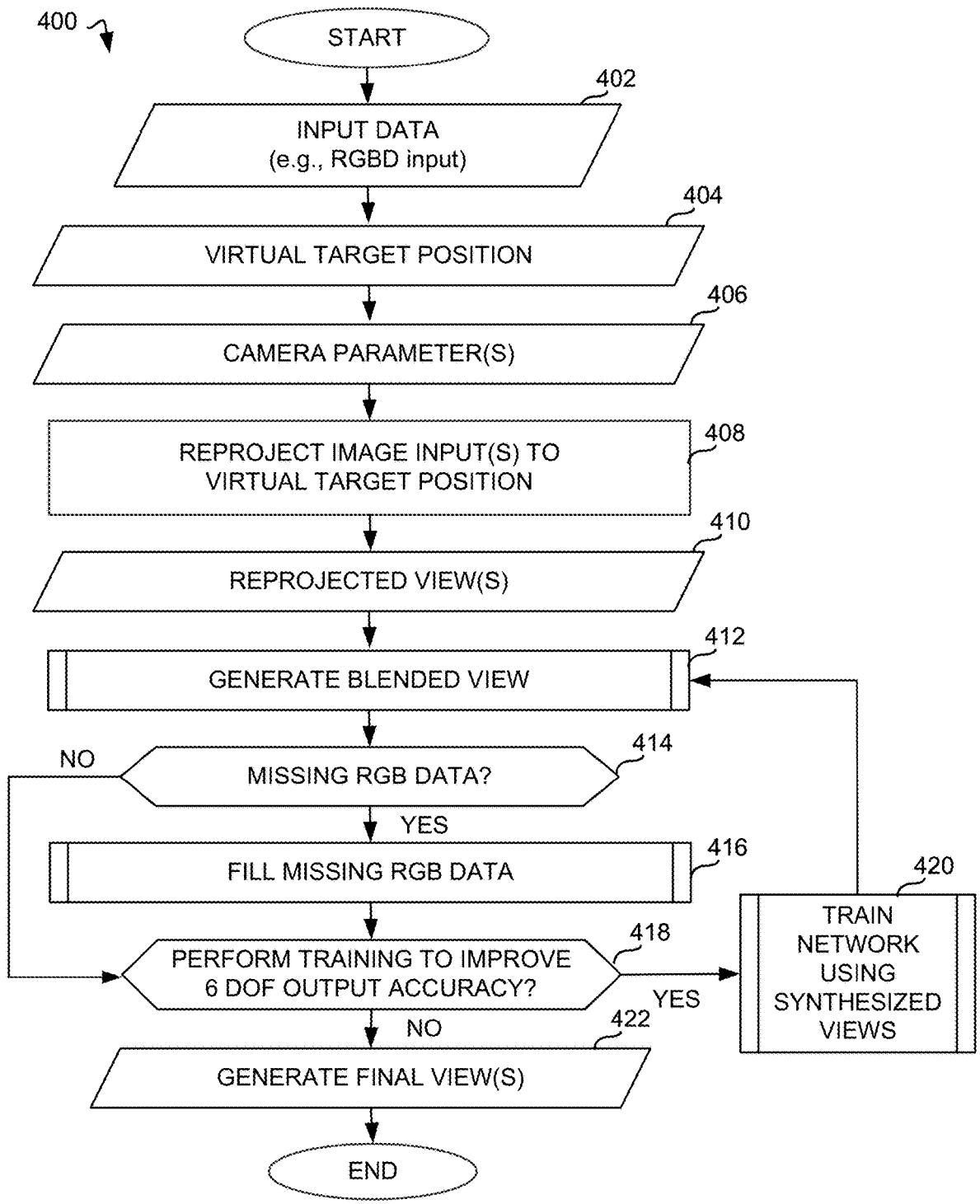
FIG. 4 is a flowchart representative of example machine readable instructions that may be executed by example processor circuitry to implement the pre-processing circuitry, blending circuitry, inpainting circuitry, and/or training circuitry of FIG. 1.

A flowchart representative of example hardware logic circuitry, machine readable instructions, hardware implemented state machines, and/or any combination thereof for implementing the preprocessing circuitry 110 of FIG. 2 is shown in FIG. 4. The machine readable instructions may be one or more executable programs or portion(s) of an executable program for execution by processor circuitry, such as the processor circuitry 1212 shown in the example processor platform 1200 discussed below in connection with FIG. 12 and/or the example processor circuitry discussed below in connection with FIGS. 16 and/or 17. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 4, many other methods of implementing the example preprocessing circuitry 110 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

Figure 5:
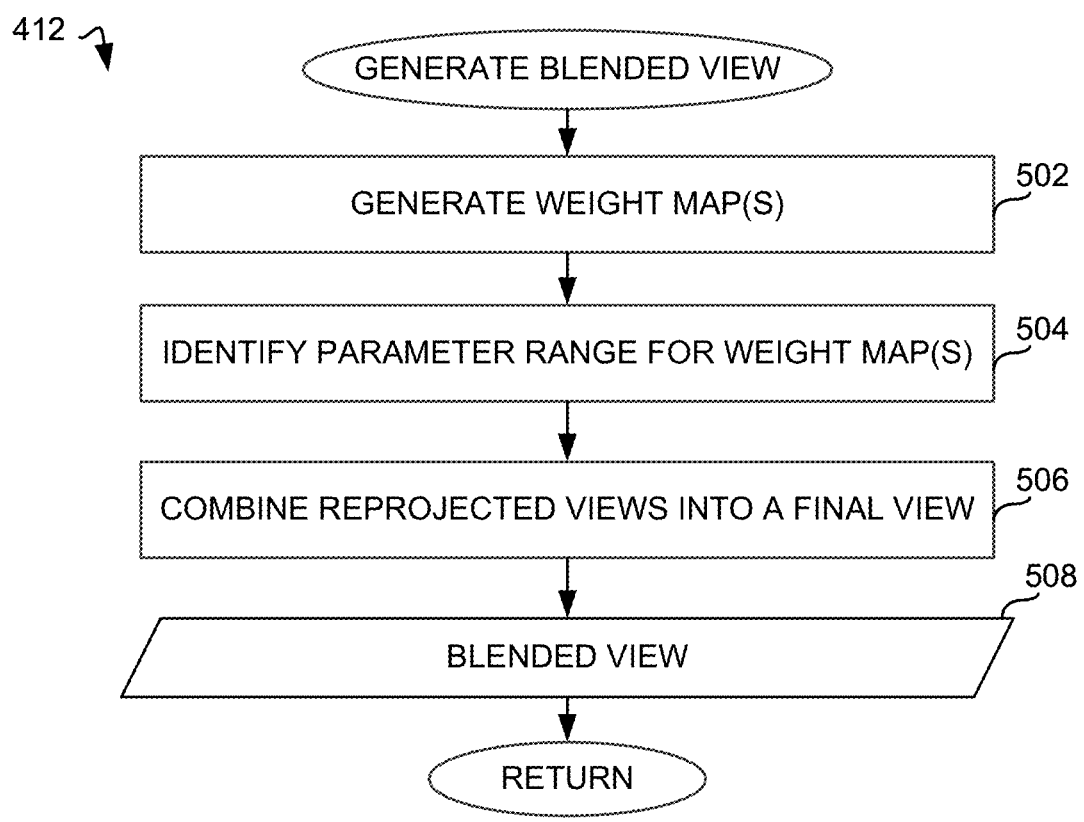
FIG. 5 is a flowchart representative of example machine readable instructions that may be executed by example processor circuitry to implement the blending circuitry of FIGS. 1 and/or 2.

Flowcharts representative of example hardware logic circuitry, machine readable instructions, hardware implemented state machines, and/or any combination thereof for implementing the blending circuitry 120 of FIG. 2 is shown in FIGS. 4, 5. The machine readable instructions may be one or more executable programs or portion(s) of an executable program for execution by processor circuitry, such as the processor circuitry 1312 shown in the example processor platform 1300 discussed below in connection with FIG. 13 and/or the example processor circuitry discussed below in connection with FIGS. 16 and/or 17. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 4, 5, many other methods of implementing the example blending circuitry 120 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

Figure 6:
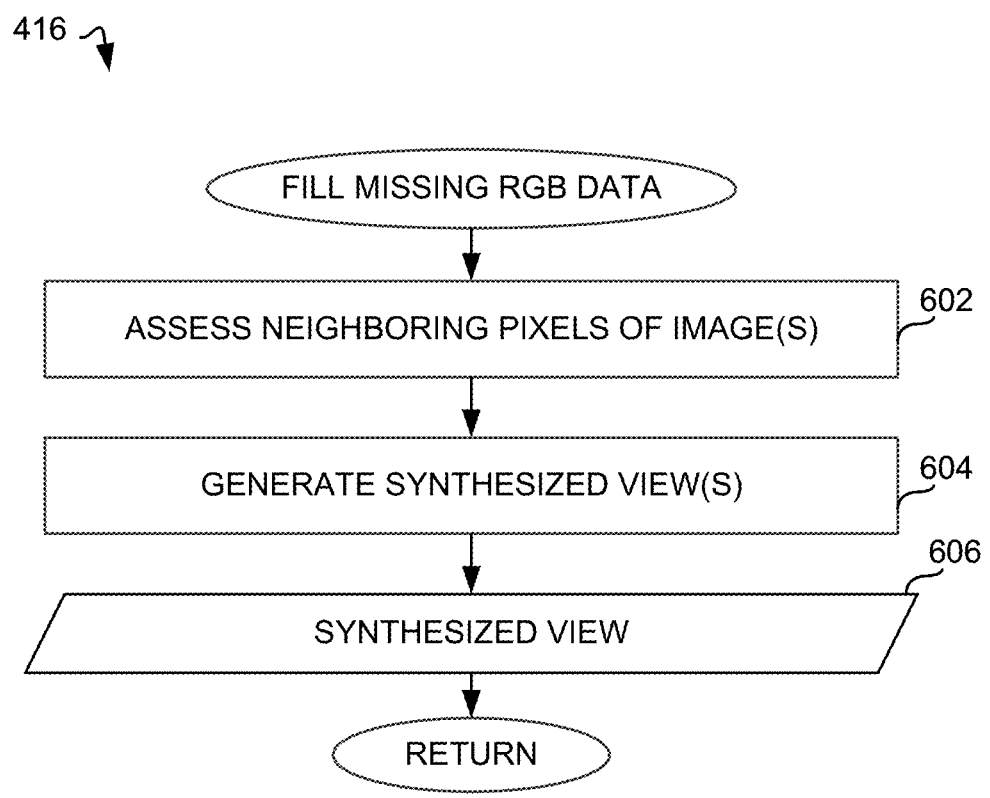
FIG. 6 is a flowchart representative of example machine readable instructions that may be executed by example processor circuitry to implement the inpainting circuitry of FIGS. 1 and/or 3.

Flowcharts representative of example hardware logic circuitry, machine readable instructions, hardware implemented state machines, and/or any combination thereof for implementing the inpainting circuitry 130 of FIG. 3 is shown in FIGS. 4, 6. The machine readable instructions may be one or more executable programs or portion(s) of an executable program for execution by processor circuitry, such as the processor circuitry 1412 shown in the example processor platform 1400 discussed below in connection with FIG. 14 and/or the example processor circuitry discussed below in connection with FIGS. 16 and/or 17. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 4, 6, many other methods of implementing the example inpainting circuitry 130 of FIG. 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

Figure 7:
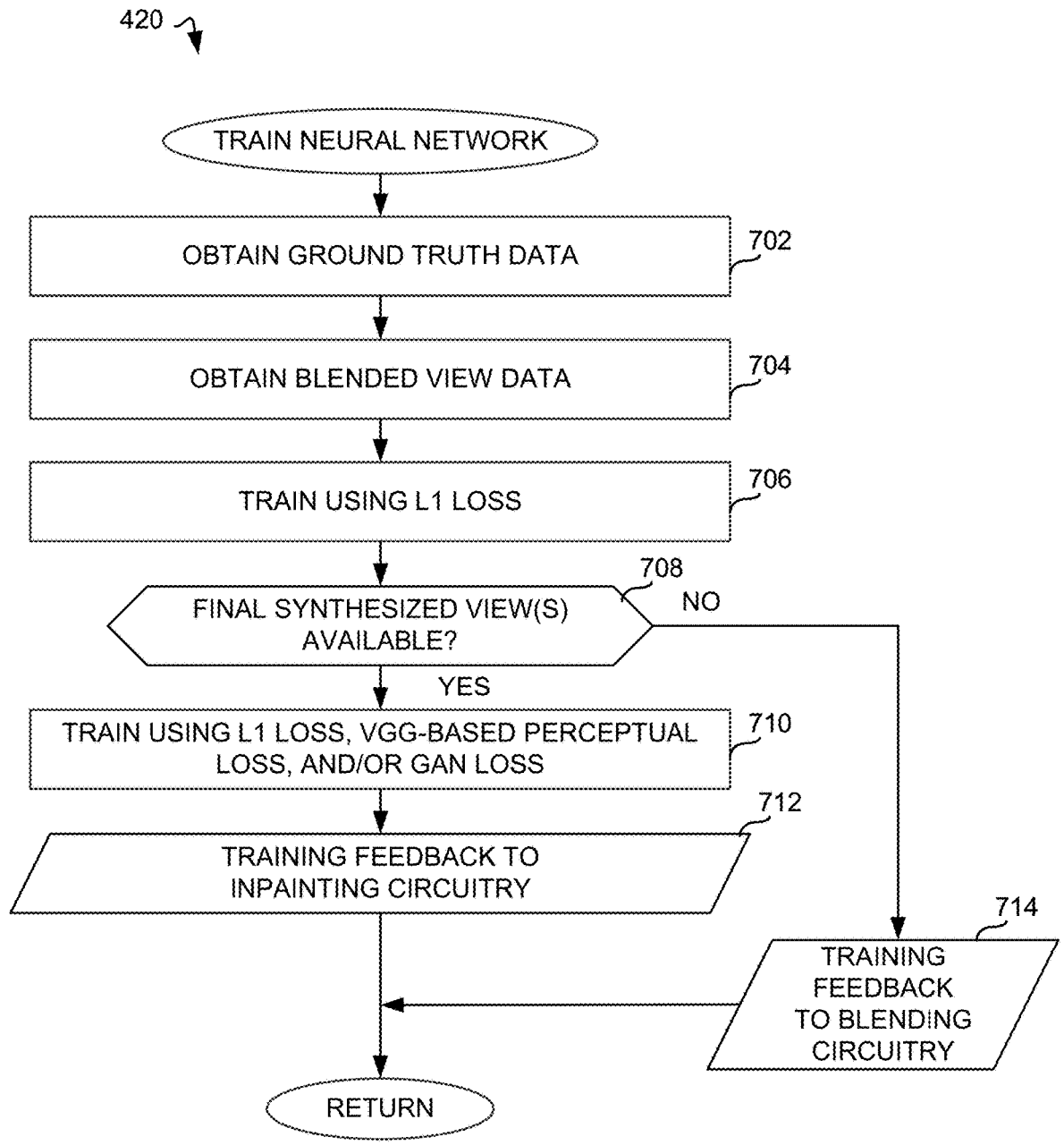
FIG. 7 is a flowchart representative of example machine readable instructions that may be executed by example processor circuitry to implement the training circuitry of FIGS. 1 and/or 3.

Flowcharts representative of example hardware logic circuitry, machine readable instructions, hardware implemented state machines, and/or any combination thereof for implementing the training circuitry 140 of FIG. 3 is shown in FIGS. 4, 7. The machine readable instructions may be one or more executable programs or portion(s) of an executable program for execution by processor circuitry, such as the processor circuitry 1512 shown in the example processor platform 1500 discussed below in connection with FIG. 15 and/or the example processor circuitry discussed below in connection with FIGS. 16 and/or 17. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 4, 7, many other methods of implementing the example training circuitry 140 of FIG. 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions 400 that may be executed by example processor circuitry to implement the pre-processing circuitry 110, blending circuitry 120, inpainting circuitry 130, and/or training circuitry 140 of FIG. 1. In the example of FIG. 1, the preprocessing circuitry 110 receives input data corresponding to RGBD input 102 (block 402), virtual target camera position input 106 (block 404), and/or camera parameter input 104 (block 406) via the image data receiving circuitry 202, the camera parameter receiving circuitry 204, and/or the camera position receiving circuitry 206 of FIG. 2. The preprocessing circuitry 110 uses the received input data to reproject images input(s) 102 to the virtual target camera position (block 408). For example, the RGBD input(s) 102 include camera intrinsic/extrinsic parameters. In some examples, the RGBD input(s) 102 are obtained from different angles. In the example of FIG. 4, the preprocessing circuitry 110 reprojects the input image(s) to the target position using the re-projecting circuitry 208, providing example reprojected views (e.g., reprojected view(s) 112 of FIG. 1) (block 410). For example, the reprojected views are focused on the target camera position, with the RGBD views that were initially provided to the preprocessing circuitry 110 reprojected to yield the same number of reprojected views, as shown in the example of FIG. 1. The reprojected view(s) 112 serve as input into the blending circuitry 120 of FIG. 1 via the reprojected view receiving circuitry 252 of FIG. 2. The blending circuitry 120 generates a blended view based on weight maps, as described in connection with FIG. 5 (block 412). For example, the blending circuitry 120 outputs the blended view 128 of FIG. 1. In some examples, the blended view 128 is missing data that does not have any RGB assignment because of occlusion/disocclusion in the original inputs (e.g., dark regions without any image information as shown in the reprojected views 852, 854, 856, 858 of FIG. 8). In the example of FIG. 4, the inpainting circuitry 130 receives the blended view 128 input information using the blended view receiving circuitry 302 to determine whether there are any missing regions in the blended view 128 and/or the individual reprojected view(s) 112 (block 414). If data is determined to be missing, the inpainting circuitry 130 proceeds to fill the missing RGB data using the view synthetizing circuitry 304 of FIG. 3, as described in connection with FIG. 6 (block 416). If the inpainting circuitry 130 determines that RGB data is not missing, control proceeds to the training circuitry 140 (block 418). Likewise, once the missing RGB data has been provided via the inpainting circuitry 130, control also proceeds to the training circuitry 140 (block 418). In some examples, the training circuitry 140 can perform training to improve the six degree-of-freedom (DOF) output accuracy by training the neural network(s) using synthesized views (block 420), as described in connection with FIG. 7. In some examples, the output from the training circuitry 140 can be provided to the blending circuitry 120 and/or the inpainting circuitry 130, as shown in connection with FIG. 1. Once training is complete, the inpainting circuitry 130 is used to generate a final view (e.g., synthesis video result following a specific motion trajectory) (block 422).

FIG. 5 is a flowchart representative of example machine readable instructions 412 that may be executed by example processor circuitry to implement the blending circuitry 120 of FIGS. 1 and/or 2. In the example of FIG. 5, the blending circuitry 120 receives reprojected view(s) 112 from the preprocessing circuitry 110 via the reprojected view receiving circuitry 252 of FIG. 2. The weight map generating circuitry 254 generates weight map(s) as shown in connection with the weight map(s) 124 of FIG. 1 (block 502). For example, the weight map generating circuitry 254 can include the use of a convolutional neural network (CNN). In some examples, the weight map generating circuitry 254 uses skip connection(s) to learn weight map(s) (e.g., weight map(s) 124). In some examples, normalization circuitry 258 follows convolutional layer(s) of the network with a group normalization and a leaky rectified linear unit (ReLU). In some examples, the normalization circuitry 258 follows the last convolutional layer of the network with a group normalization and/or sigmoid unit to restrict the output parameter value range to [0,1] for the weight map (block 504). In some examples, the combining circuitry 256 combines the reprojected views (e.g., reprojected views 112) to obtain the blended view 128 (block 506). The blending circuitry 120 then outputs the blended view for further processing by the inpainting circuitry 130 (block 508).

FIG. 6 is a flowchart representative of example machine readable instructions 416 that may be executed by example processor circuitry to implement the inpainting circuitry 130 of FIGS. 1 and/or 3. In the example of FIG. 6, the blending view receiving circuitry 302 receives the blended view output generated by the blending circuitry 120 (e.g., blended view 128 of FIG. 1). The blended view receiving circuitry 302 assesses neighboring pixel(s) of the views (block 602). For example, the inpainting circuitry 130 can include a generative adversarial network (GAN), such that blended reprojected views with regions including missing RGB information can be properly completed by analyzing and using their neighborhood content. The view synthesizing circuitry 304 generates a synthesized view of the in-painted content to yield the final synthesized view 132 of FIG. 1 (block 604). As such, the final synthesized view can be further processed by the training circuitry 140 to improve the accuracy of the output as compared to the ground truth data (e.g., obtained from the ground truth view 148 of FIG. 1). As such, the inpainting circuitry 130 fills missing data of the blended views and completes the target virtual view (e.g., final synthesized view 132) by analyzing and/or using neighborhood information associated with the missing data of the reprojected views 112.

FIG. 7 is a flowchart representative of example machine readable instructions 420 that may be executed by example processor circuitry to implement the training circuitry 140 of FIGS. 1 and/or 3. In the example of FIG. 7, the ground truth receiving circuitry 352 receives the ground truth data (e.g., ground truth view 148) (block 702). The image data receiving circuitry 354 obtains synthesized view data from the inpainting circuitry 130 (block 704) and/or blended view(s) from the blending circuitry 120. In some examples, the training circuitry 140 trains the network(s) using L1 loss (block 706). For example, the training circuitry 140 uses an intermedia L1 loss between the ground truth and the blended view after the blending circuitry 120 processes the input views, as shown in the example of FIG. 1. To eliminate the impact of the regions without any RGB information, the training circuitry 140 can retain a mask for the blended view to only consider the L1 loss on the valid content region. Once the training circuitry 140 obtains the final synthesized view (block 708), the training can be performed using L1 loss, VGG-based perceptual loss, and/or GAN loss to further train the synthesis network after view processing using the inpainting circuitry 130 is complete (block 710). If the synthesized view(s) are not available, the training circuitry 140 provides training feedback to the blending circuitry 120 (block 714). Once the training using L1 loss, VGG-based perceptual loss, and/or GAN loss is completed, the training circuitry 140 provides feedback to the inpainting circuitry (block 712). In some examples, the training circuitry 140 includes dataset generating circuitry 356 to generate a dataset for view synthesis training based on sparse indoor and/or outdoor RGB environment captures. For example, camera intrinsic parameters, rotation/translation matrices, and/or depth maps for each image can be identified such that the RGB image can be packed with its depth map and/or camera parameters into a binary file. Dataset generating circuitry 356 can be used to create a view synthesis including input views and/or the reconstructed novel view. For example, for each RGB image, the feature estimating circuitry 358 can be used to estimate feature correspondences between a current RGB image and the rest of the images in a given scene. For example, neighbors of a given image can be identified based on the feature correspondence numbers. In some examples, the dataset generating circuitry 356 can use a current RGB image as the ground truth while randomly choosing neighbor images (e.g., four images) from the neighbor list (e.g., containing a total of eight images) as the input views, while the rotation/translation matrices of the current RGB image can be used as the target position to construct a training datapoint.

Figure 8:
FIG. 8 is an example illustration of ground truth data and reprojected views.
Figure 8:
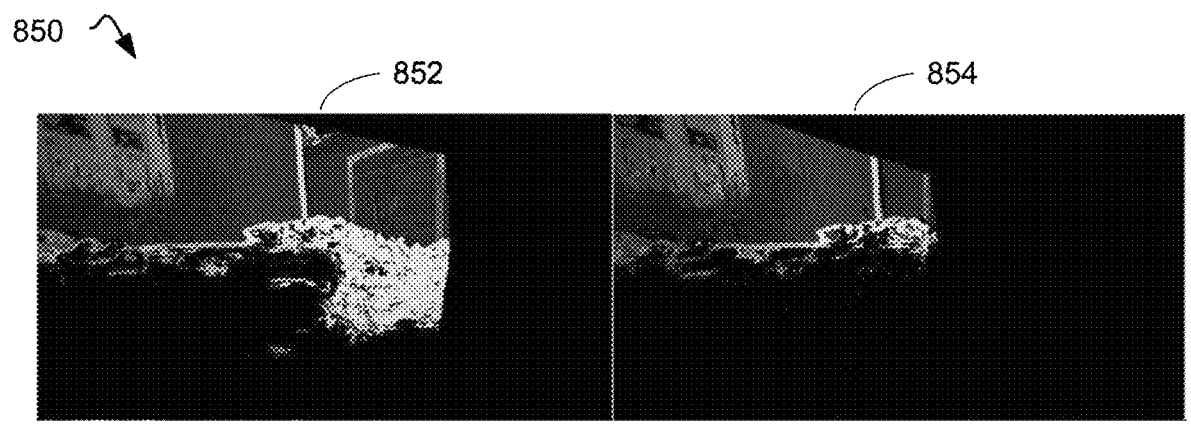
Figure 8:
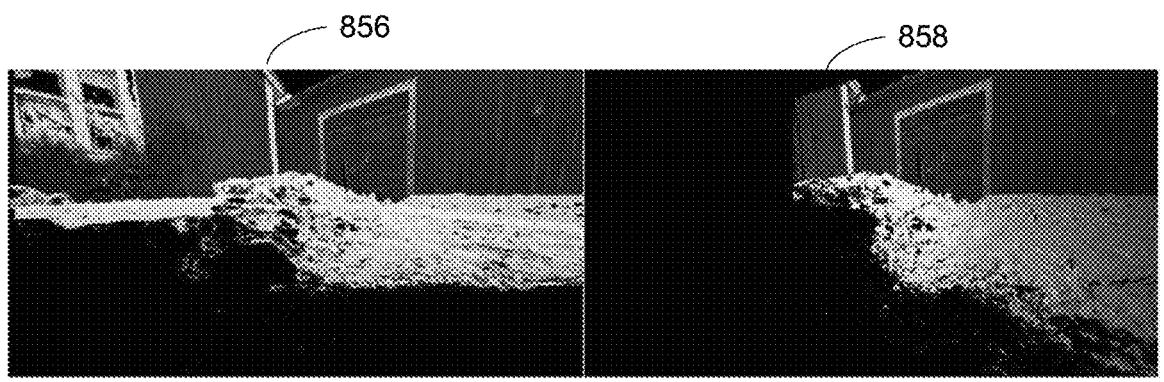

FIG. 8 is an example illustration of ground truth data 800 and reprojected views 850. In the example of FIG. 8, the ground truth data 800 (e.g., corresponding to the ground truth view 148 of FIG. 1) and example reprojected views 850 are obtained from sparse Red Green Blue (RGB)-depth inputs provided to a deep neural network for synthesizing 6 DOF views (e.g., the end-to-end deep learning network 100 of FIG. 1). In the example of FIG. 8, RGBD inputs include camera intrinsic/extrinsic parameters and/or a target virtual position with orientation. For example, four RGBD inputs can be taken from different angles. However, any number of RGBD inputs can be provided and/or any positioning of the views associated with the RGBD inputs can be used. Using methods and apparatus disclosed herein, a virtual novel view can be synthesized as if the view was taken from the target location. As described in the methods and apparatus disclosed herein, the training/inference process can be performed end-to-end with no separate preprocessing and/or postprocessing modules. For example, a training/testing data preprocessor can be incorporated into the deep learning pipeline for data flow management. As such, RGBD inputs and their camera parameters can be provided to a data preprocessor for view reprojection (e.g., the preprocessing circuitry 110 of FIG. 1). In some examples, camera intrinsic parameters, camera extrinsic parameters, and/or depth maps can be used to reconstruct a virtual view at the target position through RGB pixel remapping. In the example of FIG. 8, input images are reprojected to the target position (e.g., a view between two objects of interest), providing example reprojected views 852, 854, 856, 858. In some examples, the reprojected views 852, 854, 856, 858 can include missing data that does not have any RGB assignment because of occlusion/disocclusion in the original inputs (e.g., dark regions without any image information as shown in the reprojected views 852, 854, 856, 858). In the example of FIG. 8, the reprojected views 852, 854, 856, 858 serve as inputs for the deep neutral network (e.g., the convolutional neural network of the blending circuitry 120 of FIG. 1), which allows these reprojected views 852, 854, 856, 858 to be further refined through the neural network training process. In some examples, a generative adversarial network (GAN) is used to blend and/or in-paint the reprojected views 852, 854, 856, 858 using the inpainting circuitry 130. For example, a stacked network structure with two stages can be implemented such that the first stage is a blending network (e.g., implemented using the blending circuitry 120 of FIG. 1) used to estimate four weight maps (e.g., weight maps 124) and/or combine four reprojected views 852, 854, 856, 858 into one final view (e.g., blended view 128) according to the generated weight maps. In some examples, the stacked network structure includes a second stage that serves as an inpainting network (e.g., implemented using the inpainting circuitry 130 of FIG. 1) that fills missing data of the blended views and completes the target virtual view (e.g., final synthesized view 132) by analyzing and/or using neighborhood information associated with the missing data of the reprojected views 852, 854, 856, 858.

Figure 9:
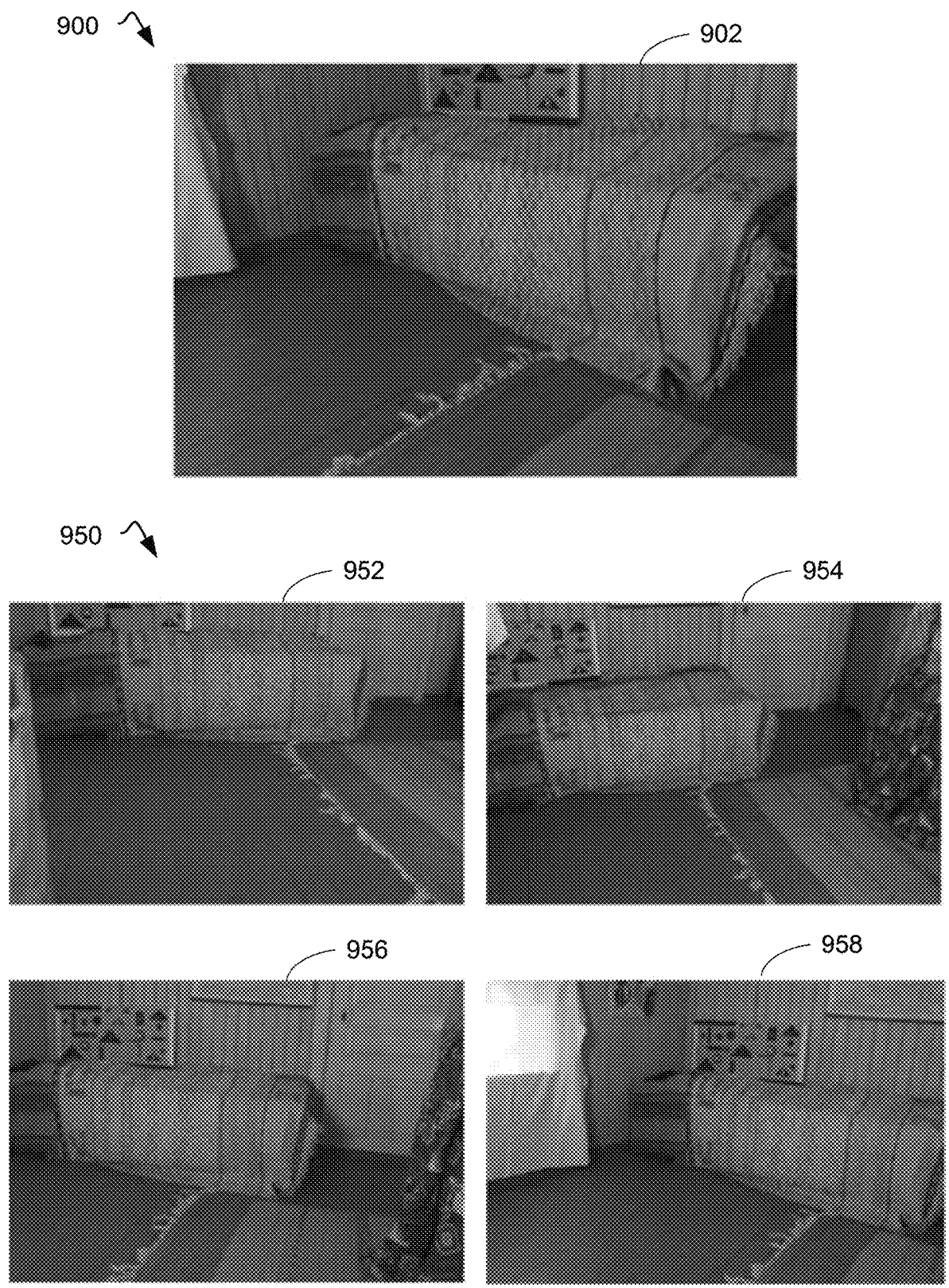
FIG. 9 is an example of training input views and ground truth data.

FIG. 9 is an example of ground truth data 900 and training input views 950 that can be used as part of the training performed by the training circuitry 140 of FIG. 1. In the example of FIG. 9, training can be performed on a dataset with 70561 training datapoints, an Adam optimizer, a learning rate of 0.001, and a batch size of 1. However, any other quantity of datapoints, optimizer selection, learning rate, and/or batch size can also be used. For example, to generate a dataset for view synthesis training, a total of 20 scenes of sparse indoor/outdoor RGB environment captures can be collected. For each scene, a general-purpose Structure-from-Motion (SfM) and Multi-View Stereo (MVS) pipeline with a graphical and command-line interface can be used (e.g., COLMAP) to estimate the camera intrinsic parameters, rotation/translation matrices, and/or depth maps for each image. In some examples, the RGB image is packed with its depth map and camera parameters into a binary file, as shown in connection with FIG. 10. To construct the training data point, a view synthesis relationship is needed which contains the input views (e.g., example input views 952, 954, 956, 958) and the reconstructed novel view. Specifically, for each RGB image (e.g., from a total of four images), feature correspondences can be estimated between a current RGB image and the remaining images of a given scene, with neighbors of the RGB image (e.g., eight total neighbors) associated with feature correspondence numbers. The current RGB image (e.g., example image 902) can be used as the ground truth data 900, with randomly chosen four neighbor images from the eight-neighbor list as the input views. In some examples, the rotation/translation matrices of the current RGB image 902 can be selected as the target position to construct a training datapoint, as shown in connection with FIG. 10.

Figure 10:
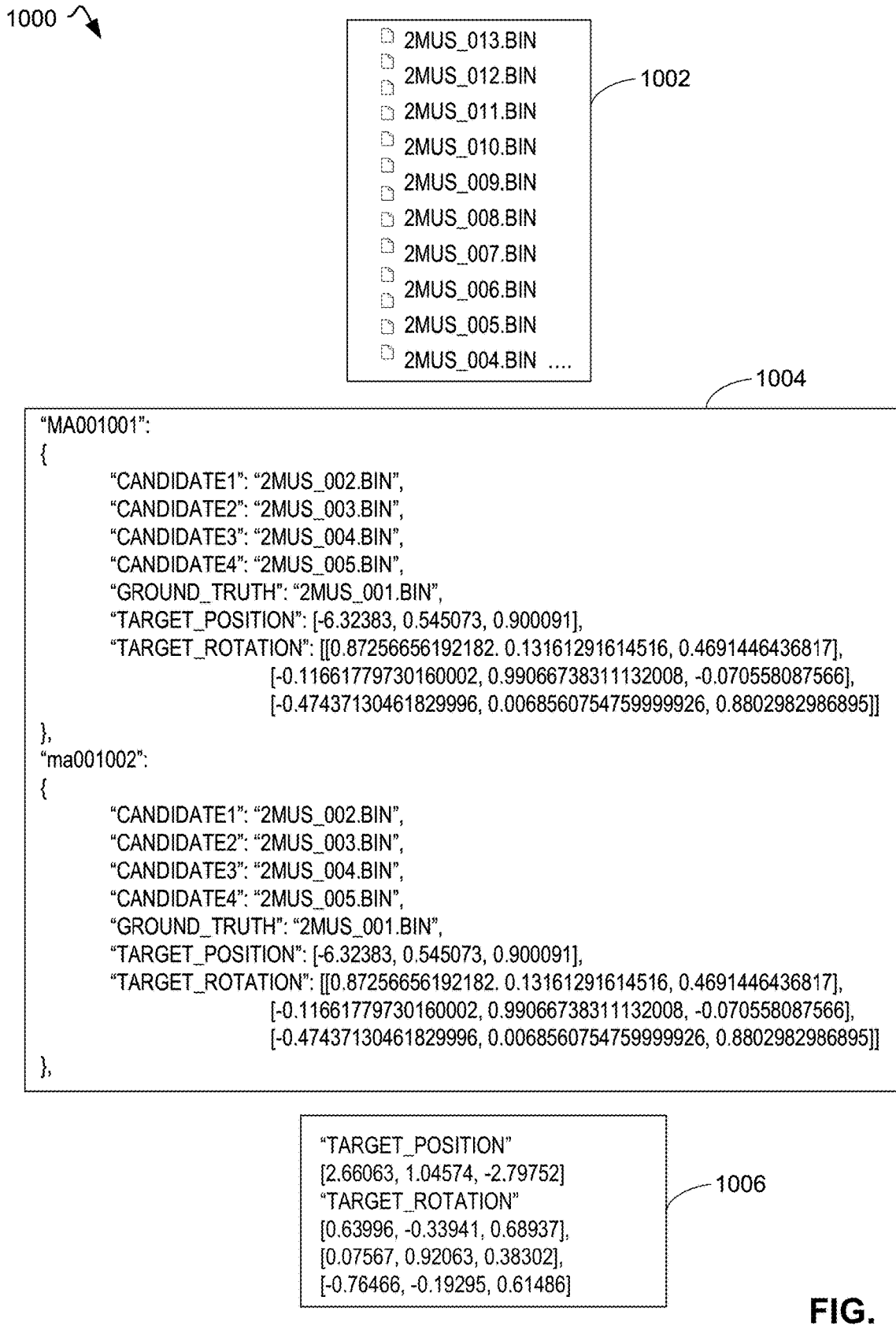
FIG. 10 is an example of dataset generation used during training and identification of a target location.

FIG. 10 is an example of dataset generation 1000 used during training and identification of a target location. In the example of FIG. 10, a set of binary image files 1002 can be identified and used as input during identification of a synthesis relationship file 1004. Additionally, an example target location file 1006 can be used to determine a target position and/or a target rotation. In some examples, the training circuitry 140 of FIG. 1 can generate 70561 synthesis training data points and use a JavaScript Object Notation (JSON) file to communicate with the training pipeline. In some examples, the collected scenes have different resolutions (e.g., resolutions ranging from 1228×816 to 3264×4912). In some examples, the training circuitry 140 of FIG. 1 can randomly crop 640×640 patches from the original data point. In some examples, each data point can include 4 RGBD inputs. Given that every data point needs to go through a view reprojection preprocessing step (e.g., using the preprocessor circuitry 110 of FIG. 1), data flow needs to be carefully designed for efficient training. For example, using a single patch with large resolution for training is much more efficient than using multiple patches with small resolution. Therefore, the input to the neural network can be a single patch data with 4 stacked reprojected views, each view having a resolution 640×640.

Figure 11:
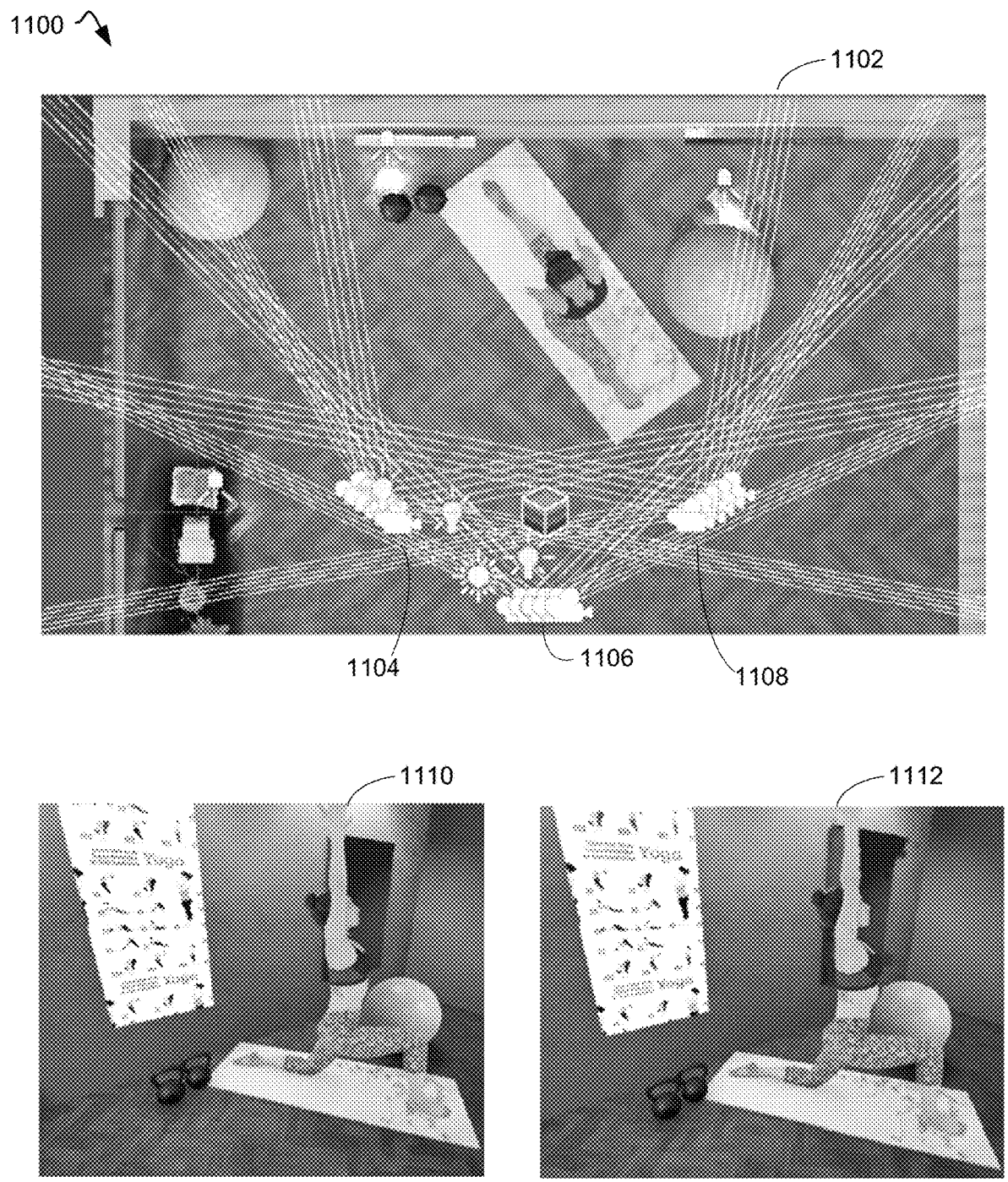
FIG. 11 is an example of camera arrangement locations, sparse input views, and final synthesized views obtained using the convolutional end-to-end deep learning network of FIG. 1.

FIG. 11 is an example illustration 1100 of camera arrangement locations 1102, sparse input views 1110, and final synthesized views 1112 obtained using the convolutional end-to-end deep learning network 100 of FIG. 1. In the example of FIG. 11, the deep learning network 100 of FIG. 1 can be evaluated using various datasets, including a simulation dataset acquired from a sparse camera array-captured dataset, a Moving Picture Experts Group (MPEG) view synthesis dataset, and/or a Google soft 3D reconstruction dataset. In some examples, virtual viewpoint moving trajectories are generated with a sequence of target positions and/or rotation matrices. The motion trajectories can be used as the target location inputs for the novel view synthesis performed by the deep learning network 100 of FIG. 1. In the example of FIG. 11, a total of 15 cameras (e.g., in example camera positions 1104, 1106, 110) are placed in a large space to capture different sides of an object and/or a person of interest (e.g., yoga coach). In the example of FIG. 11, one example sparse input view 1110 is shown (e.g., out of a total of 15 sparse input views). In the example of FIG. 11, the synthesized output 1112 is shown as an image. However, the final output is a synthesis video result following a specific motion trajectory. Additionally, when the same RGB dataset with different depth map input generated by the deep learning network 100 of FIG. 1 is compared to an RGB dataset with depth map input generated by other methods (e.g., a Facebook pixFlow method, a capturing reality method, etc.), all three depth maps can generate reasonable novel view synthesis results. However, the depth maps generated using methods and apparatus disclosed herein yield an improved synthesis quality with a reduced number of artifacts. As such, methods and apparatus disclosed herein permit the generation of virtual novel viewpoints that are far from the original camera location. In some examples, synthesis artifacts that result in limited input view information can be reduced by increasing the input view data amount.

Figure 12:
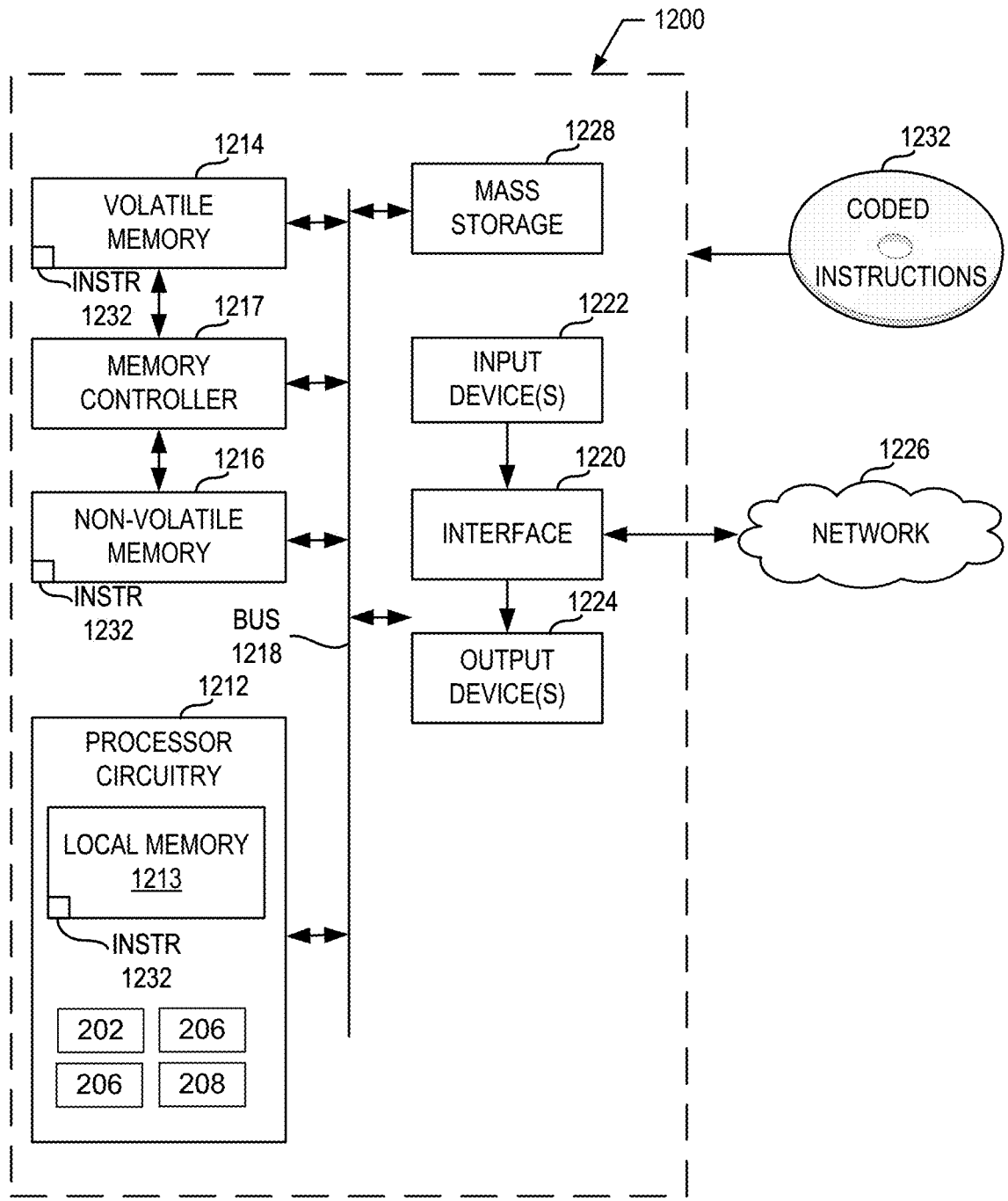
FIG. 12 is a block diagram of an example processing platform including processor circuitry structured to execute the example machine readable instructions of FIG. 4 to implement the preprocessing circuitry of FIG. 2.

FIG. 12 is a block diagram of an example processing platform 1200 including processor circuitry structured to execute the example machine readable instructions of FIG. 4 to implement the preprocessing circuitry 110 of FIG. 2. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements image data receiving circuitry 202, the camera parameter receiving circuitry 204, the camera position receiving circuitry 206, and/or the re-projecting circuitry 208.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuitry 1220 of the illustrated example. The output devices 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1232, which may be implemented by the machine readable instructions of FIG. 4, may be stored in the mass storage device 1228, in the volatile memory 1214, in the non-volatile memory 1216, and/or on a removable non-transitory computer readable storage medium such as a CD or DVD.

Figure 13:
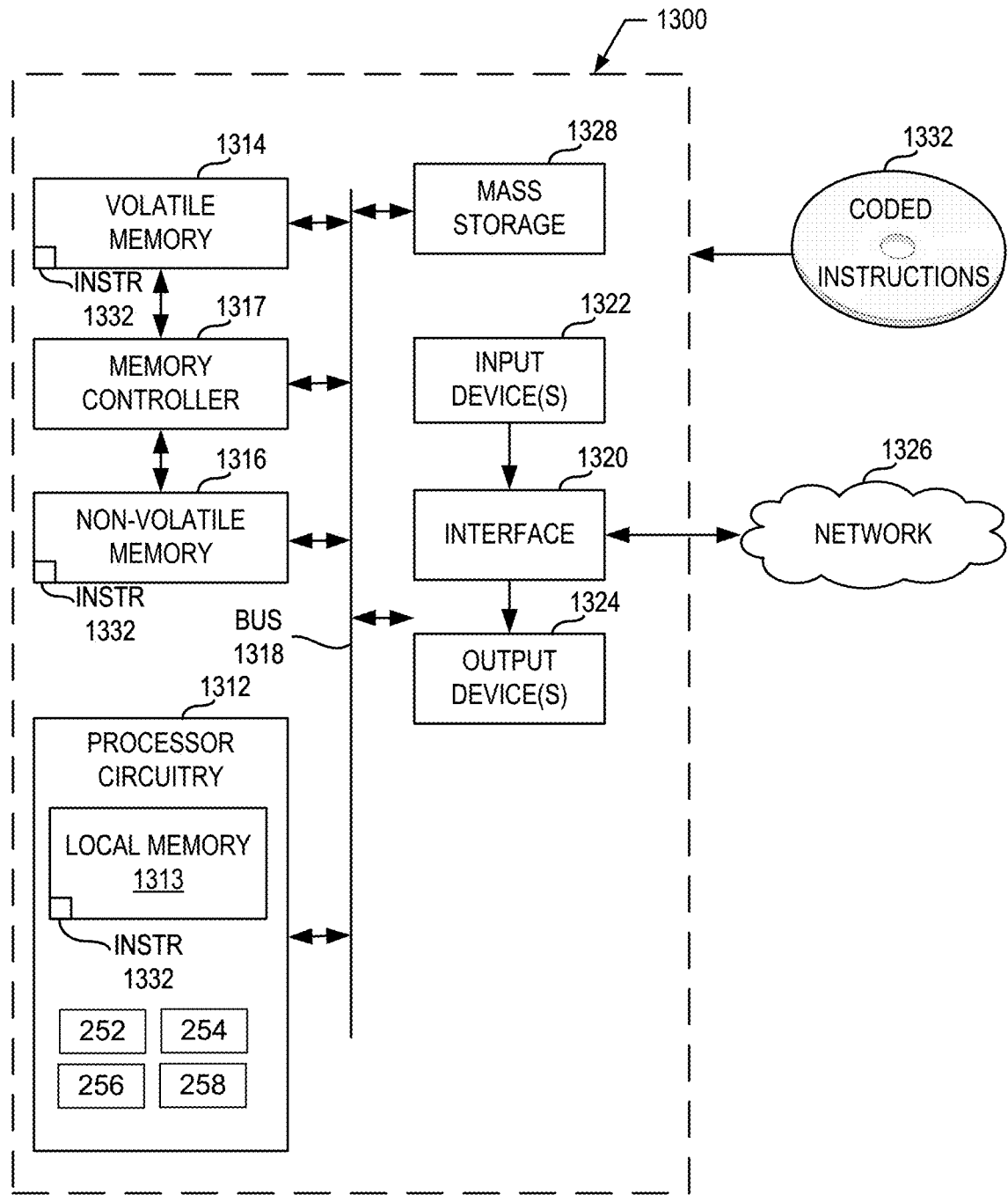
FIG. 13 is a block diagram of an example processing platform including processor circuitry structured to execute the example machine readable instructions of FIG. 5 to implement the blending circuitry of FIG. 2.

FIG. 13 is a block diagram of an example processing platform 1300 including processor circuitry structured to execute the example machine readable instructions of FIG. 5 to implement the blending circuitry 120 of FIG. 2. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs microprocessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements reprojected view receiving circuitry 252, weight map generating circuitry 254, combining circuitry 256, and/or normalization circuitry 258.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuitry 1320 of the illustrated example. The output devices 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1332, which may be implemented by the machine readable instructions of FIG. 5, may be stored in the mass storage device 1328, in the volatile memory 1314, in the non-volatile memory 1316, and/or on a removable non-transitory computer readable storage medium such as a CD or DVD.

Figure 14:
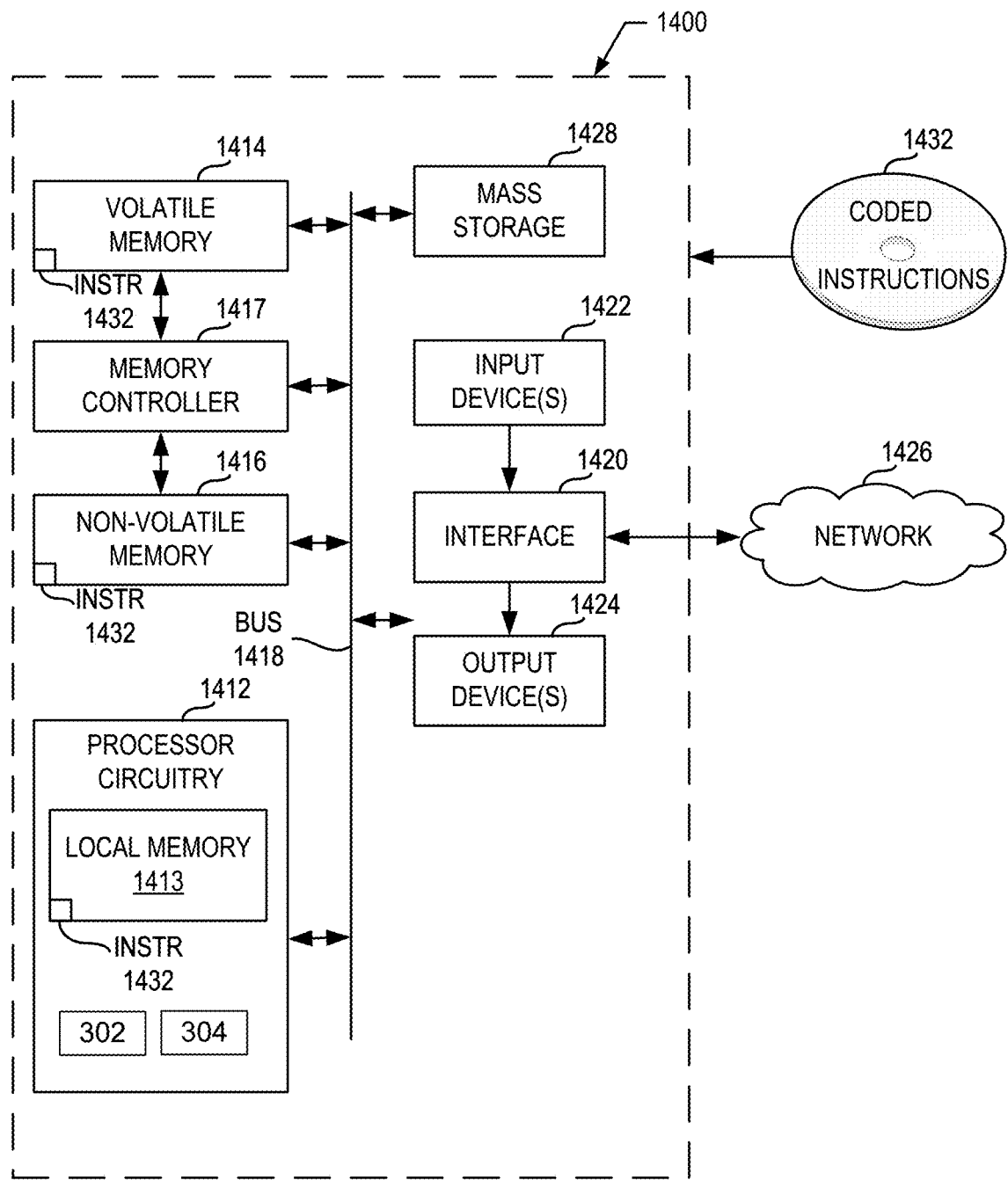
FIG. 14 is a block diagram of an example processing platform including processor circuitry structured to execute the example machine readable instructions of FIG. 6 to implement the inpainting circuitry of FIG. 3.

FIG. 14 is a block diagram of an example processing platform 1400 including processor circuitry structured to execute the example machine readable instructions of FIG. 6 to implement the inpainting circuitry 130 of FIG. 3. The processor platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1400 of the illustrated example includes processor circuitry 1412. The processor circuitry 1412 of the illustrated example is hardware. For example, the processor circuitry 1412 can be implemented by one or more integrated circuits, logic circuits, FPGAs microprocessors, CPUs, GPUs, DSPs, and/or microcontrollers from any desired family or manufacturer. The processor circuitry 1412 may be implemented by one or more semiconductor based (e.g., silicon based) devices. In this example, the processor circuitry 1412 implements the blended view receiving circuitry 302 and/or the view synthesizing circuitry 304.

The processor circuitry 1412 of the illustrated example includes a local memory 1413 (e.g., a cache, registers, etc.). The processor circuitry 1412 of the illustrated example is in communication with a main memory including a volatile memory 1414 and a non-volatile memory 1416 by a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1416 may be implemented by flash memory and/or any other desired type of memory device. Access to the main memory 1414, 1416 of the illustrated example is controlled by a memory controller 1417.

The processor platform 1400 of the illustrated example also includes interface circuitry 1420. The interface circuitry 1420 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1422 are connected to the interface circuitry 1420. The input device(s) 1422 permit(s) a user to enter data and/or commands into the processor circuitry 1412. The input device(s) 1422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1424 are also connected to the interface circuitry 1420 of the illustrated example. The output devices 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1420 of the illustrated example, thus, typically includes a graphics driver card, a graphics driver chip, and/or graphics processor circuitry such as a GPU.

The interface circuitry 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1426. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1400 of the illustrated example also includes one or more mass storage devices 1428 to store software and/or data. Examples of such mass storage devices 1428 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1432, which may be implemented by the machine readable instructions of FIG. 6, may be stored in the mass storage device 1428, in the volatile memory 1414, in the non-volatile memory 1416, and/or on a removable non-transitory computer readable storage medium such as a CD or DVD.

Figure 15:
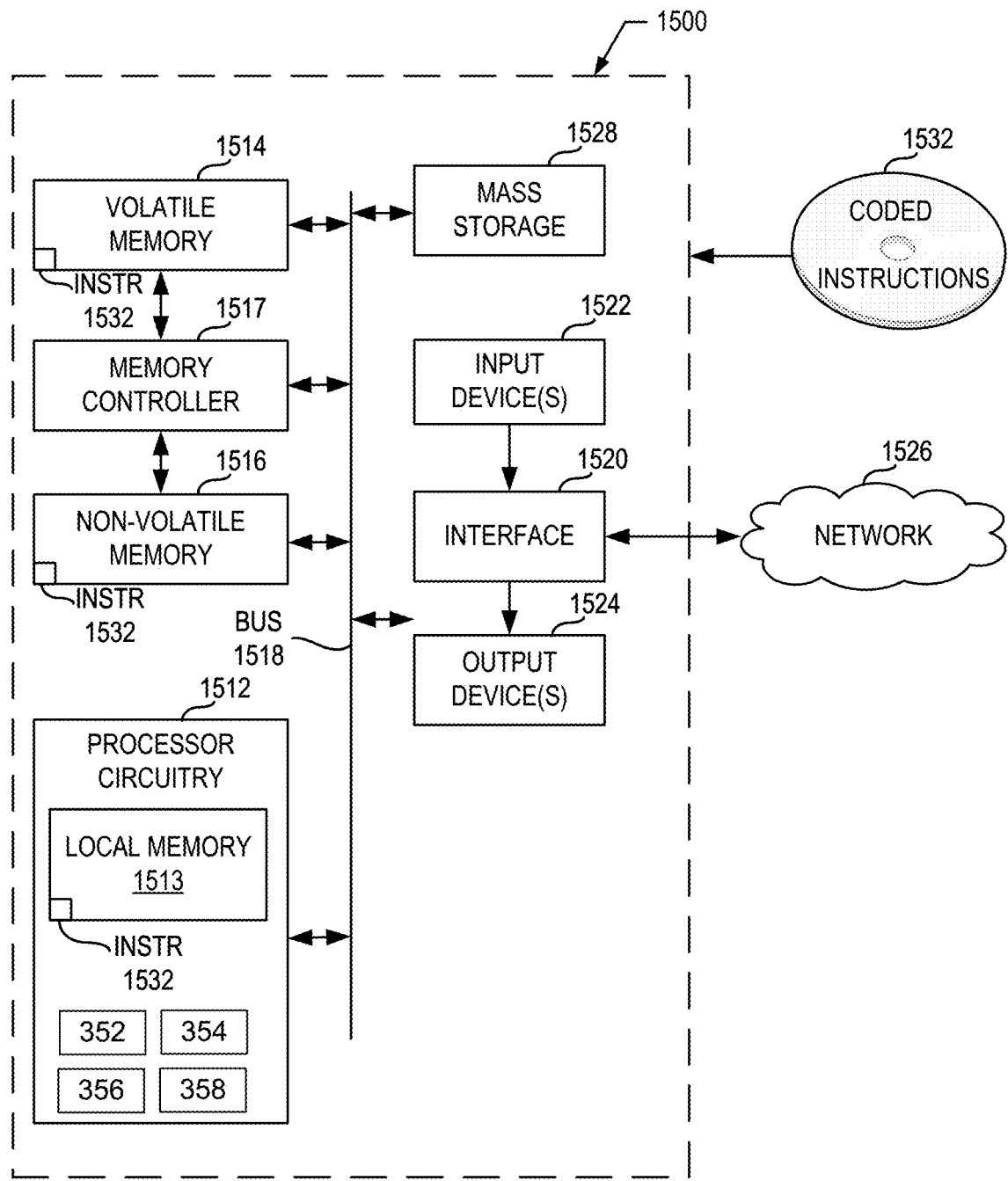
FIG. 15 is a block diagram of an example processing platform including processor circuitry structured to execute the example machine readable instructions of FIG. 7 to implement the training circuitry of FIG. 3.

FIG. 15 is a block diagram of an example processing platform 1500 including processor circuitry structured to execute the example machine readable instructions of FIG. 7 to implement the training circuitry 140 of FIG. 3. The processor platform 1500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1500 of the illustrated example includes processor circuitry 1512. The processor circuitry 1512 of the illustrated example is hardware. For example, the processor circuitry 1512 can be implemented by one or more integrated circuits, logic circuits, FPGAs microprocessors, CPUs, GPUs, DSPs, and/or microcontrollers from any desired family or manufacturer. The processor circuitry 1512 may be implemented by one or more semiconductor based (e.g., silicon based) devices. In this example, the processor circuitry 1512 implements the ground truth receiving circuitry 352, the image data receiving circuitry 354, the dataset generating circuitry 356, and/or the feature estimating circuitry 358.

The processor circuitry 1512 of the illustrated example includes a local memory 1513 (e.g., a cache, registers, etc.). The processor circuitry 1512 of the illustrated example is in communication with a main memory including a volatile memory 1514 and a non-volatile memory 1516 by a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1516 may be implemented by flash memory and/or any other desired type of memory device. Access to the main memory 1514, 1516 of the illustrated example is controlled by a memory controller 1517.

The processor platform 1500 of the illustrated example also includes interface circuitry 1520. The interface circuitry 1520 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1522 are connected to the interface circuitry 120. The input device(s) 1522 permit(s) a user to enter data and/or commands into the processor circuitry 1512. The input device(s) 1522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1524 are also connected to the interface circuitry 1520 of the illustrated example. The output devices 1524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1520 of the illustrated example, thus, typically includes a graphics driver card, a graphics driver chip, and/or graphics processor circuitry such as a GPU.

The interface circuitry 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1500 of the illustrated example also includes one or more mass storage devices 1528 to store software and/or data. Examples of such mass storage devices 1528 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1532, which may be implemented by the machine readable instructions of FIG. 7, may be stored in the mass storage device 1528, in the volatile memory 1514, in the non-volatile memory 1516, and/or on a removable non-transitory computer readable storage medium such as a CD or DVD.

Figure 16:
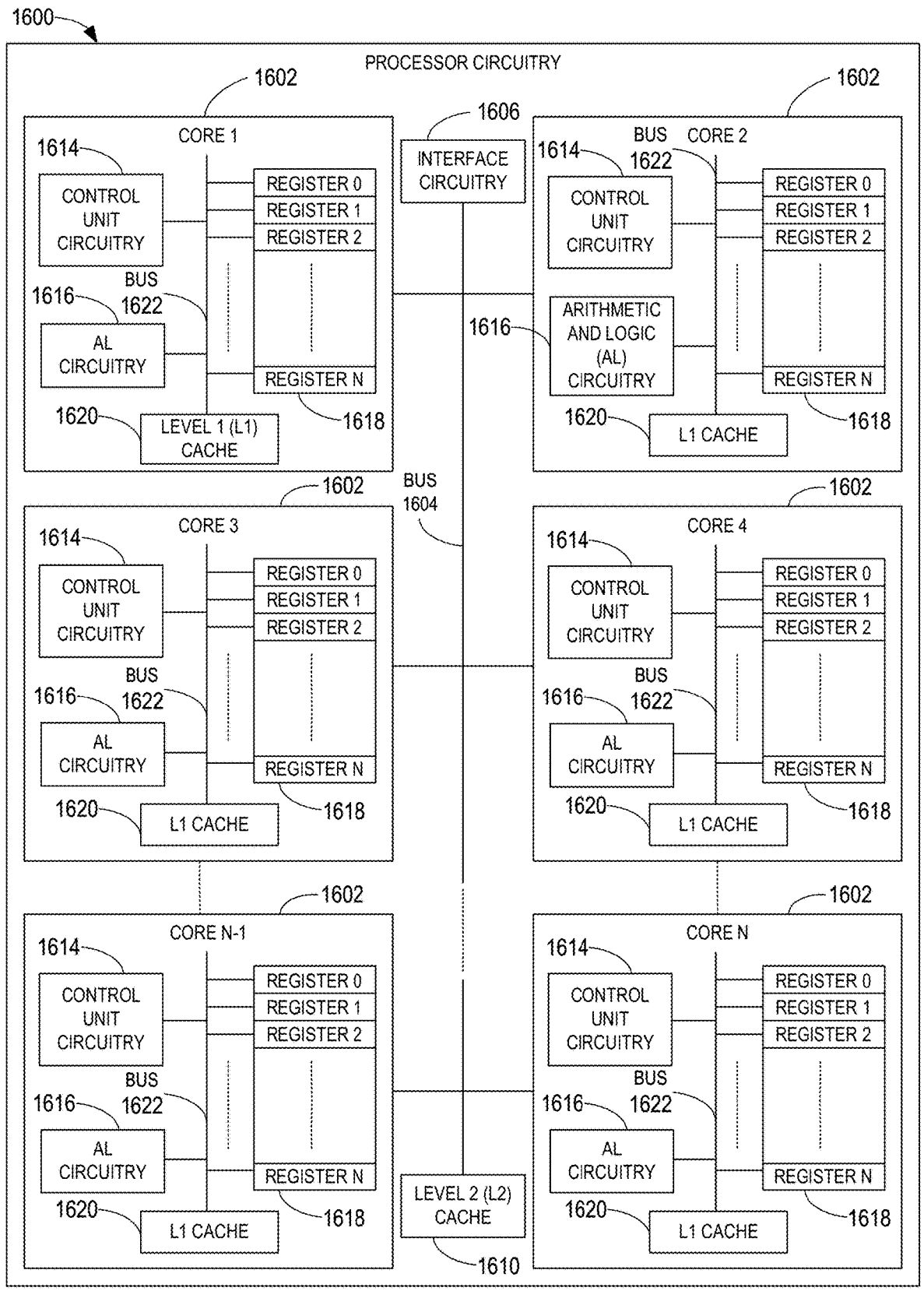
FIG. 16 is a block diagram of an example implementation of the processor circuitry of FIGS. 12, 13, 14, and/or 15.

FIG. 16 is a block diagram 1600 of an example implementation of the processor circuitry of FIGS. 12, 13, 14, and/or 15. FIG. In this example, the processor circuitry 1212, 1312, 1412, 1512 of FIGS. 12, 13, 14, 15 is implemented by a microprocessor 1600. For example, the microprocessor 1600 may implement multi-core hardware circuitry such as a CPU, a DSP, a GPU, an XPU, etc. Although it may include any number of example cores 1602 (e.g., 1 core), the microprocessor 1600 of this example is a multi-core semiconductor device including N cores. The cores 1602 of the microprocessor 1600 may operate independently or may cooperate to execute machine readable instructions. For example, machine code corresponding to a firmware program, an embedded software program, or a software program may be executed by one of the cores 1602 or may be executed by multiple ones of the cores 1602 at the same or different times. In some examples, the machine code corresponding to the firmware program, the embedded software program, or the software program is split into threads and executed in parallel by two or more of the cores 1602. The software program may correspond to a portion or all of the machine readable instructions and/or operations represented by the flowcharts of FIGS. 4, 5, 6, 7.

The cores 1602 may communicate by an example bus 1604. In some examples, the bus 1604 may implement a communication bus to effectuate communication associated with one(s) of the cores 1602. For example, the bus 1604 may implement at least one of an Inter-Integrated Circuit (I2C) bus, a Serial Peripheral Interface (SPI) bus, a PCI bus, or a PCIe bus. Additionally or alternatively, the bus 1604 may implement any other type of computing or electrical bus. The cores 1602 may obtain data, instructions, and/or signals from one or more external devices by example interface circuitry 1606. The cores 1602 may output data, instructions, and/or signals to the one or more external devices by the interface circuitry 1606. Although the cores 1602 of this example include example local memory 1620 (e.g., Level 1 (L1) cache that may be split into an L1 data cache and an L1 instruction cache), the microprocessor 1600 also includes example shared memory 1610 that may be shared by the cores (e.g., Level 2 (L2_cache)) for high-speed access to data and/or instructions. Data and/or instructions may be transferred (e.g., shared) by writing to and/or reading from the shared memory 1610. The local memory 1620 of each of the cores 1602 and the shared memory 1610 may be part of a hierarchy of storage devices including multiple levels of cache memory and the main memory (e.g., the main memory 1214, 1216, 1314, 1316, 1414, 1416, 1514, 1516 of FIGS. 12, 13, 14, 15). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1602 may be referred to as a CPU, DSP, GPU, etc., or any other type of hardware circuitry. Each core 1602 includes control unit circuitry 1614, arithmetic and logic (AL) circuitry (sometimes referred to as an ALU) 1616, a plurality of registers 1618, the L1 cache 1620, and an example bus 1622. Other structures may be present. For example, each core 1602 may include vector unit circuitry, single instruction multiple data (SIMD) unit circuitry, load/store unit (LSU) circuitry, branch/jump unit circuitry, floating-point unit (FPU) circuitry, etc. The control unit circuitry 1614 includes semiconductor-based circuits structured to control (e.g., coordinate) data movement within the corresponding core 1602. The AL circuitry 1616 includes semiconductor-based circuits structured to perform one or more mathematic and/or logic operations on the data within the corresponding core 1602. The AL circuitry 1616 of some examples performs integer based operations. In other examples, the AL circuitry 1616 also performs floating point operations. In yet other examples, the AL circuitry 1616 may include first AL circuitry that performs integer based operations and second AL circuitry that performs floating point operations. In some examples, the AL circuitry 1616 may be referred to as an Arithmetic Logic Unit (ALU). The registers 1618 are semiconductor-based structures to store data and/or instructions such as results of one or more of the operations performed by the AL circuitry 1616 of the corresponding core 1602. For example, the registers 1618 may include vector register(s), SIMD register(s), general purpose register(s), flag register(s), segment register(s), machine specific register(s), instruction pointer register(s), control register(s), debug register(s), memory management register(s), machine check register(s), etc. The registers 1618 may be arranged in a bank as shown in FIG. 16. Alternatively, the registers 1618 may be organized in any other arrangement, format, or structure including distributed throughout the core 1602 to shorten access time. The bus 1620 may implement at least one of an I2C bus, a SPI bus, a PCI bus, or a PCIe bus.

Each core 1602 and/or, more generally, the microprocessor 1600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 17:
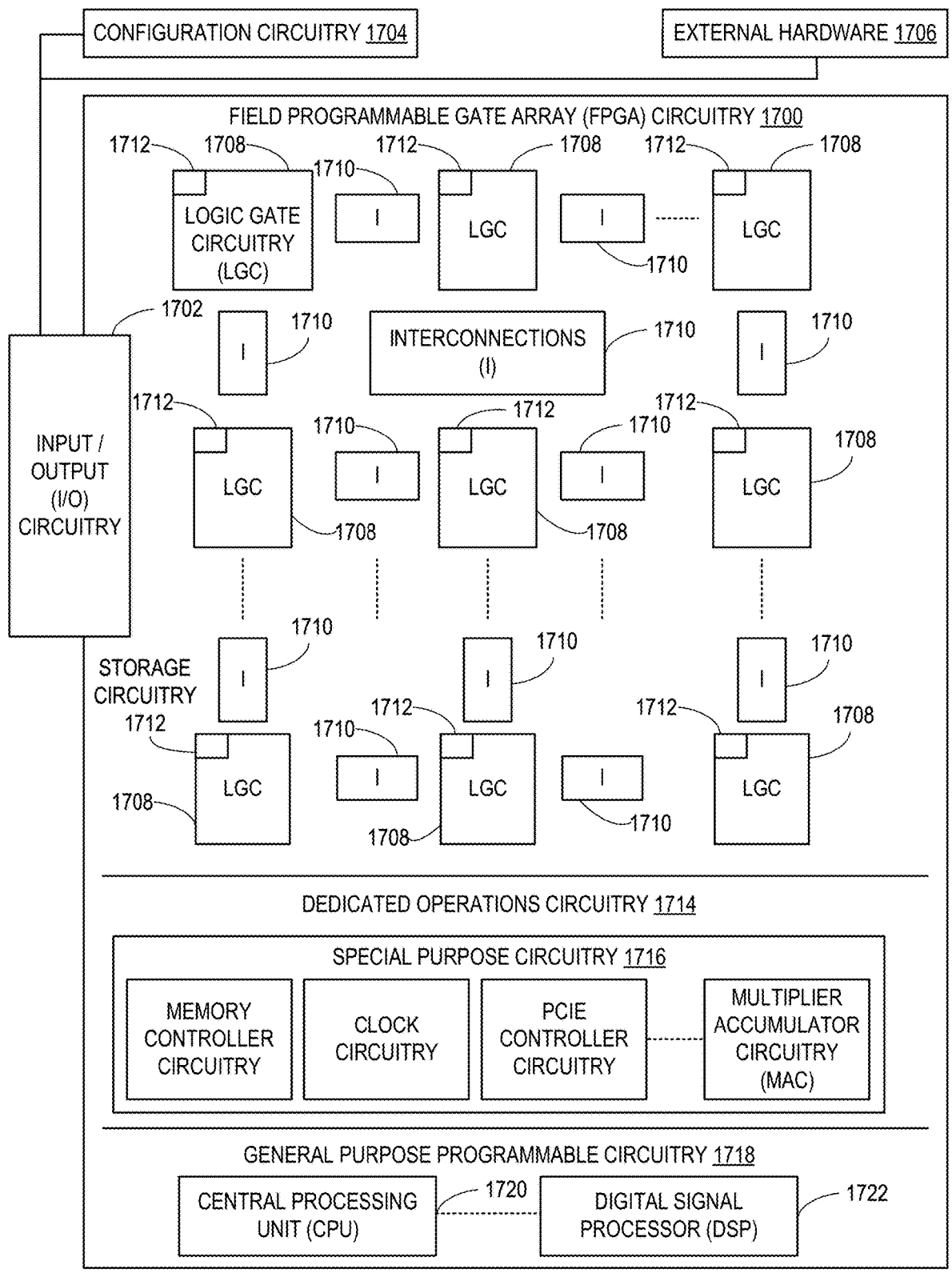
FIG. 17 is a block diagram of another example implementation of the processor circuitry of FIGS. 12, 13, 14, and/or 15.

FIG. 17 is a block diagram 1700 of another example implementation of the processor circuitry of FIGS. 12, 13, 14, and/or 15. In this example, the processor circuitry 1212, 1312, 1412, 1512 is implemented by FPGA circuitry 1700. The FPGA circuitry 1700 can be used, for example, to perform operations that could otherwise be performed by the example microprocessor 1600 of FIG. 16 executing corresponding machine readable instructions. However, once configured, the FPGA circuitry 1700 instantiates the machine readable instructions in hardware and, thus, can often execute the operations faster than they could be performed by a general purpose microprocessor executing the corresponding software.

More specifically, in contrast to the microprocessor 1600 of FIG. 16 described above (which is a general purpose device that may be programmed to execute some or all of the machine readable instructions represented by the flowcharts of FIGS. 4, 5, 6, 7 but whose interconnections and logic circuitry are fixed once fabricated), the FPGA circuitry 1700 of the example of FIG. 17 includes interconnections and logic circuitry that may be configured and/or interconnected in different ways after fabrication to instantiate, for example, some or all of the machine readable instructions represented by the flowcharts of FIGS. 4, 5, 6, 7. In particular, the FPGA 1700 may be thought of as an array of logic gates, interconnections, and switches. The switches can be programmed to change how the logic gates are interconnected by the interconnections, effectively forming one or more dedicated logic circuits (unless and until the FPGA circuitry 1700 is reprogrammed). The configured logic circuits enable the logic gates to cooperate in different ways to perform different operations on data received by input circuitry. Those operations may correspond to some or all of the software represented by the flowcharts of FIGS. 4, 5, 6, 7. As such, the FPGA circuitry 1700 may be structured to effectively instantiate some or all of the machine readable instructions of the flowcharts of FIGS. 4, 5, 6, 7 as dedicated logic circuits to perform the operations corresponding to those software instructions in a dedicated manner analogous to an ASIC. Therefore, the FPGA circuitry 1700 may perform the operations corresponding to the some or all of the machine readable instructions of FIGS. 4, 5, 6, 7 faster than the general purpose microprocessor can execute the same.

In the example of FIG. 17, the FPGA circuitry 1700 is structured to be programmed (and/or reprogrammed one or more times) by an end user by a hardware description language (HDL) such as Verilog. The FPGA circuitry 1700 of FIG. 17, includes example input/output (I/O) circuitry 1702 to obtain and/or output data to/from example configuration circuitry 1704 and/or external hardware (e.g., external hardware circuitry) 1706. For example, the configuration circuitry 1704 may implement interface circuitry that may obtain machine readable instructions to configure the FPGA circuitry 1700, or portion(s) thereof. In some such examples, the configuration circuitry 1704 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1706 may implement the microprocessor 1600 of FIG. 16. The FPGA circuitry 1700 also includes an array of example logic gate circuitry 1708, a plurality of example configurable interconnections 1710, and example storage circuitry 1712. The logic gate circuitry 1708 and interconnections 1710 are configurable to instantiate one or more operations that may correspond to at least some of the machine readable instructions of FIGS. 4, 5, 6, 7 and/or other desired operations. The logic gate circuitry 1708 shown in FIG. 17 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1708 to enable configuration of the electrical structures and/or the logic gates to form circuits to perform desired operations. The logic gate circuitry 1708 may include other electrical structures such as look-up tables (LUTs), registers (e.g., flip-flops or latches), multiplexers, etc.

The interconnections 1710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1708 to program desired logic circuits.

The storage circuitry 1712 of the illustrated example is structured to store result(s) of the one or more of the operations performed by corresponding logic gates. The storage circuitry 1712 may be implemented by registers or the like. In the illustrated example, the storage circuitry 1712 is distributed amongst the logic gate circuitry 1708 to facilitate access and increase execution speed.

The example FPGA circuitry 1700 of FIG. 17 also includes example Dedicated Operations Circuitry 1714. In this example, the Dedicated Operations Circuitry 1714 includes special purpose circuitry 1716 that may be invoked to implement commonly used functions to avoid the need to program those functions in the field. Examples of such special purpose circuitry 1716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1700 may also include example general purpose programmable circuitry 1718 such as an example CPU 1720 and/or an example DSP 1722. Other general purpose programmable circuitry 1718 may additionally or alternatively be present such as a GPU, an XPU, etc., that can be programmed to perform other operations.

Although FIGS. 16 and 17 illustrate two example implementations of the processor circuitry 1212, 1312, 1412, 1512 of FIGS. 12, 13, 14, 15, many other approaches are contemplated. For example, as mentioned above, modern FPGA circuitry may include an on-board CPU, such as one or more of the example CPU 1720 of FIG. 17. Therefore, the processor circuitry 1212, 1312, 1412, 1512 of FIGS. 12, 13, 14, 15 may additionally be implemented by combining the example microprocessor 1600 of FIG. 16 and the example FPGA circuitry 1700 of FIG. 17. In some such hybrid examples, a first portion of the machine readable instructions represented by the flowcharts of FIGS. 4, 5, 6, 7 may be executed by one or more of the cores 1602 of FIG. 16 and a second portion of the machine readable instructions represented by the flowcharts of FIGS. 4, 5, 6, 7 may be executed by the FPGA circuitry 1700 of FIG. 17.

In some examples, the processor circuitry 1212, 1312, 1412, 1512 of FIGS. 12, 13, 14, 15 may be in one or more packages. For example, the processor circuitry 1600 of FIG. 16 and/or the FPGA circuitry 1700 of FIG. 17 may be in one or more packages. In some examples, an XPU may be implemented by the processor circuitry 1212, 1312, 1412, 1512 of FIGS. 12, 13, 14, 15, which may be in one or more packages. For example, the XPU may include a CPU in one package, a DSP in another package, a GPU in yet another package, and an FPGA in still yet another package.

Figure 18:
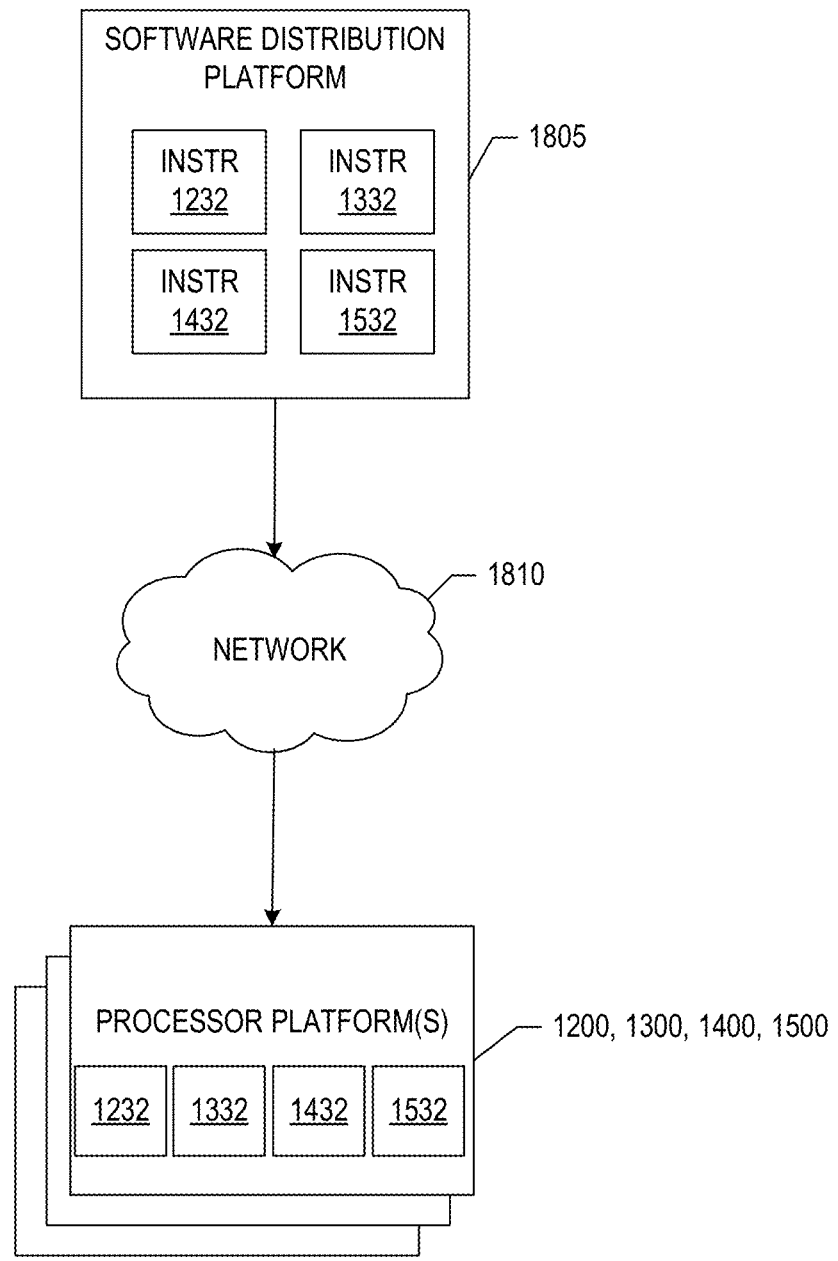
FIG. 18 is a block diagram of an example software distribution platform (e.g., one or more servers) to distribute software (e.g., software corresponding to the example machine readable instructions of FIGS. 4, 5, 6, 7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1805 to distribute software such as the example machine readable instructions 1232, 1332, 1432, 1532 of FIGS. 12, 13, 14, 15 to hardware devices owned and/or operated by third parties is illustrated in FIG. 18. The example software distribution platform 1805 may be implemented by any computer server, data facility, cloud service, etc., capable of storing and transmitting software to other computing devices. The third parties may be customers of the entity owning and/or operating the software distribution platform 1805. For example, the entity that owns and/or operates the software distribution platform 1805 may be a developer, a seller, and/or a licensor of software such as the example machine readable instructions 1232, 1332, 1432, 1532 of FIGS. 12, 13, 14, 15. The third parties may be consumers, users, retailers, OEMs, etc., who purchase and/or license the software for use and/or re-sale and/or sub-licensing. In the illustrated example, the software distribution platform 1805 includes one or more servers and one or more storage devices. The storage devices store the machine readable instructions 1232, 1332, 1432, 1532, which may correspond to the example machine readable instructions 400 of FIG. 4, as described above. The one or more servers of the example software distribution platform 1805 are in communication with a network 1810, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1232, 1332, 1432, 1532 from the software distribution platform 1805. For example, the software, which may correspond to the example machine readable instructions 400 of FIG. 4, may be downloaded to the example processor platform(s) 1200, 1300, 1400, 1500 which is to execute the machine readable instructions 1232, 1332, 1432, 1532 to implement the preprocessing circuitry 110, blending circuitry 120, inpainting circuitry 130, training circuitry 140. In some example, one or more servers of the software distribution platform 1805 periodically offer, transmit, and/or force updates to the software (e.g., the example machine readable instructions 1232, 1332, 1432, 1532 of FIGS. 12, 13, 14, 15) to ensure improvements, patches, updates, etc., are distributed and applied to the software at the end user devices.

From the foregoing, it will be appreciated that methods and apparatus disclosed herein improve the generation of six degree-of-freedom (DOF) views from sparse Red Green Blue (RGB)-depth inputs. In the examples disclosed herein, a deep learning, six DOF image-based rendering method for novel view synthesis is implemented. In some examples, sparse RGB-depth (RGBD) inputs and/or an arbitrary target position are used as inputs to generate a novel virtual view as if the view was captured from the target location. For example, the deep neutral network (DNN) disclosed herein is a fully convolutional end-to-end network without separate preprocessing and/or postprocessing modules. As such, in contrast to known light field generation networks that can only handle limited viewpoint changes, the DNN disclosed herein can generate novel viewpoints in a large space. In some examples, reprojected views are input into a blending network to generate a blended view with missing data. In some examples, an inpainting network is used to fill the missing data of the blended view and generate the final novel views, thereby generating 6 DOF novel views in a large space with very sparse inputs. Methods and apparatus disclosed herein can be used to generate light field content for immersive virtual reality applications.

Example methods, apparatus, systems, and articles of manufacture to generate six degree-of-freedom (DOF) views from sparse RGBD inputs are disclosed herein. Further examples and combinations thereof include the following:

Example 1 includes an apparatus, comprising at least one memory, instructions in the apparatus, and processor circuitry to execute the instructions to reproject a first red-green-blue (RGB) depth view and a second RGB depth view to a target camera position to obtain a first reprojected view and a second reprojected view, combine the first reprojected view and the second reprojected view into a blended view data based on a first weight map and a second weight map, the blended view including missing RGB depth information due to at least one of an occlusion or a disocclusion, and generate a six degree-of-freedom synthesized view of the blended view data, the synthesized view including the missing RGB depth information.

Example 2 includes the apparatus of example 1, wherein the processor circuitry is to reproject the first RGB depth view and the second RGB depth view based on camera parameters, the camera parameters including at least one of an extrinsic camera parameter or an intrinsic camera parameter.

Example 3 includes the apparatus of example 1, wherein the processor circuitry is to apply a convolutional neural network to combine the first reprojected view and the second reprojected view into the blended view data.

Example 4 includes the apparatus of example 3, wherein the processor circuitry is to apply a generative adversarial network to generate the synthesized view including the missing RGB depth information.

Example 5 includes the apparatus of example 4, wherein the processor circuitry is to train the convolutional neural network and the generative adversarial network jointly.

Example 6 includes the apparatus of example 1, wherein the processor circuitry is to train a first neural network used to generate the blended view using an L1 loss function, and the first neural network is a convolutional neural network.

Example 7 includes the apparatus of example 1, wherein the processor circuitry is to train a second neural network used to generate the synthesized view using at least one of an L1 loss function, a VGG loss function, or a GAN loss function, and the second neural network is a generative adversarial network.

Example 8 includes the apparatus of example 1, wherein the processor circuitry is to generate the synthesized view based on a virtual viewpoint moving trajectory with a sequence of target positions or rotation matrices.

Example 9 includes a method, comprising reprojecting a first red-green-blue (RGB) depth view and a second RGB depth view to a target camera position to obtain a first reprojected view and a second reprojected view, combining the first reprojected view and the second reprojected view into a blended view data based on a first weight map and a second weight map, the blended view including missing RGB depth information due to at least one of an occlusion or a disocclusion, and generating a six degree-of-freedom synthesized view of the blended view data, the synthesized view including the missing RGB depth information.

Example 10 includes the method of example 9, further including reprojecting the first RGB depth view and the second RGB depth view based on camera parameters, the camera parameters including at least one of an extrinsic camera parameter or an intrinsic camera parameter.

Example 11 includes the method of example 9, further including applying a convolutional neural network to combine the first reprojected view and the second reprojected view into the blended view data.

Example 12 includes the method of example 11, further including applying a generative adversarial network to generate the synthesized view including the missing RGB depth information.

Example 13 includes the method of example 12, wherein the convolutional neural network and the generative adversarial network are trained jointly.

Example 14 includes the method of example 9, further including training a first neural network used to generate the blended view using an L1 loss function, wherein the first neural network is a convolutional neural network.

Example 15 includes the method of example 9, further including training a second neural network used to generate the synthesized view using at least one of an L1 loss function, a VGG loss function, or a GAN loss function, wherein the second neural network is a generative adversarial network.

Example 16 includes the method of example 9, further including generating the synthesized view based on a virtual viewpoint moving trajectory with a sequence of target positions or rotation matrices.

Example 17 includes a non-transitory computer readable storage medium comprising computer readable instructions which, when executed, cause a processor to at least reproject a first red-green-blue (RGB) depth view and a second RGB depth view to a target camera position to obtain a first reprojected view and a second reprojected view, combine the first reprojected view and the second reprojected view into a blended view data based on a first weight map and a second weight map, the blended view including missing RGB depth information due to at least one of an occlusion or a disocclusion, and generate a six degree-of-freedom synthesized view of the blended view data, the synthesized view including the missing RGB depth information.

Example 18 includes the non-transitory computer readable storage medium as defined in example 17, wherein the computer readable instructions, when executed, cause the one or more processors to reproject the first RGB depth view and the second RGB depth view based on camera parameters, the camera parameters including at least one of an extrinsic camera parameter or an intrinsic camera parameter.

Example 19 includes the non-transitory computer readable storage medium as defined in example 17, wherein the computer readable instructions, when executed, cause the one or more processors to apply a convolutional neural network to combine the first reprojected view and the second reprojected view into the blended view data.

Example 20 includes the non-transitory computer readable storage medium as defined in example 19, wherein the computer readable instructions, when executed, cause the one or more processors to apply a generative adversarial network to generate the synthesized view including the missing RGB depth information.

Example 21 includes the non-transitory computer readable storage medium as defined in example 20, wherein the computer readable instructions, when executed, cause the one or more processors to train the convolutional neural network and the generative adversarial network jointly.

Example 22 includes the non-transitory computer readable storage medium as defined in example 17, wherein the computer readable instructions, when executed, cause the one or more processors to train a first neural network used to generate the blended view using an L1 loss function, and the first neural network is a convolutional neural network.

Example 23 includes the non-transitory computer readable storage medium as defined in example 17, wherein the computer readable instructions, when executed, cause the one or more processors to train a second neural network used to generate the synthesized view using at least one of an L1 loss function, a VGG loss function, or a GAN loss function, and the second neural network is a generative adversarial network.

Example 24 includes an apparatus, comprising means for reprojecting a first red-green-blue (RGB) depth view and a second RGB depth view to a target camera position to obtain a first reprojected view and a second reprojected view, means for combining the first reprojected view and the second reprojected view into a blended view data based on a first weight map and a second weight map, the blended view including missing RGB depth information due to at least one of an occlusion or a disocclusion, and means for generating a six degree-of-freedom synthesized view of the blended view data, the synthesized view including the missing RGB depth information.

Example 25 includes the apparatus of example 24, wherein the means for reprojecting include reprojecting the first RGB depth view and the second RGB depth view based on camera parameters, the camera parameters including at least one of an extrinsic camera parameter or an intrinsic camera parameter.

Example 26 includes the apparatus of example 24, wherein the means for combining include applying a convolutional neural network to combine the first reprojected view and the second reprojected view into the blended view data.

Example 27 includes the apparatus of example 26, wherein the means for generating include applying a generative adversarial network to generate the synthesized view including the missing RGB depth information.

Example 28 includes the apparatus of example 24, further including means for training a first neural network used to generate the blended view using an L1 loss function, wherein the first neural network is a convolutional neural network.

Example 29 includes the apparatus of example 28, further including means for training a second neural network used to generate the synthesized view using at least one of an L1 loss function, a VGG loss function, or a GAN loss function, wherein the second neural network is a generative adversarial network.

Example 30 includes the apparatus of example 29, wherein the means for training includes training the convolutional neural network and the generative adversarial network jointly.

Example 31 includes the method of example 24, wherein the means for generating include generating the synthesized view based on a virtual viewpoint moving trajectory with a sequence of target positions or rotation matrices.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   at least one memory;
   instructions in the apparatus; and
   at least one programmable circuit to be programmed based on the instructions to:
   train a convolutional neural network and a generative adversarial network jointly, the convolutional neural network to generate weight maps, the generative adversarial network to generate synthesized views;
   reproject a first red-green-blue (RGB) depth (RGBD) view and a second RGBD view to a target camera position to obtain a first reprojected view and a second reprojected view;
   combine the first reprojected view and the second reprojected view into a blended view based on a first weight map and a second weight map, the first weight map and the second weight map based on the convolutional neural network, the blended view associated with missing information due to at least one of an occlusion or a disocclusion; and
   cause the generative adversarial network to generate a first synthesized view based on the blended view, the first synthesized view to include synthesized information to fill in the missing information.

2. The apparatus of claim 1, wherein one or more of the at least one programmable circuit is to reproject the first RGBD view and the second RGBD view based on camera parameters, the camera parameters including at least one of an extrinsic camera parameter or an intrinsic camera parameter.

3. The apparatus of claim 1, wherein one or more of the at least one programmable circuit is to train the convolutional neural network using an L1 loss function.

4. The apparatus of claim 1, wherein one or more of the at least one programmable circuit is to train the generative adversarial network using at least one of an L1 loss function, a VGG loss function, or a GAN loss function.

5. The apparatus of claim 1, wherein one or more of the at least one programmable circuit is to generate the first synthesized view based on a virtual viewpoint moving trajectory with a sequence of target positions or rotation matrices.

6. A method comprising:
   training a convolutional neural network and a generative adversarial network jointly, the convolutional neural network to generate weight maps, the generative adversarial network to generate synthesized views;
   reprojecting a first red-green-blue (RGB) depth (RGBD) view and a second RGBD view to a target camera position to obtain a first reprojected view and a second reprojected view;
   combining the first reprojected view and the second reprojected view into a blended view based on a first weight map and a second weight map, the first weight map and the second weight map based on the convolutional neural network, the blended view associated with missing information due to at least one of an occlusion or a disocclusion; and
   generating, with the generative adversarial network, a first synthesized view based on the blended view, the first synthesized view including synthesized information to fill in the missing information.

7. The method of claim 6, including reprojecting the first RGBD view and the second RGBD view based on camera parameters, the camera parameters including at least one of an extrinsic camera parameter or an intrinsic camera parameter.

8. The method of claim 6, including training the convolutional neural network using an L1 loss function.

9. The method of claim 6, including training the generative adversarial network using at least one of an L1 loss function, a VGG loss function, or a GAN loss function.

10. The method of claim 6, including generating the first synthesized view based on a virtual viewpoint moving trajectory with a sequence of target positions or rotation matrices.

11. A non-transitory computer readable storage medium comprising computer readable instructions to cause at least one programmable circuit to at least:
- train a convolutional neural network and a generative adversarial network jointly, the convolutional neural network to generate weight maps, the generative adversarial network to generate synthesized views;
- reproject a first red-green-blue (RGB) depth (RGBD) view and a second RGBD view to a target camera position to obtain a first reprojected view and a second reprojected view;
- combine the first reprojected view and the second reprojected view into a blended view based on a first weight map and a second weight map, the first weight map and the second weight map based on the convolutional neural network, the blended view associated with missing information due to at least one of an occlusion or a disocclusion; and
- cause the generative adversarial network to generate a first synthesized view based on the blended view, the first synthesized view to include synthesized information to fill in the missing information.

12. The non-transitory computer readable storage medium as defined in claim 11, wherein the computer readable instructions are to cause one or more of the at least one programmable circuit to reproject the first RGBD view and the second RGBD view based on camera parameters, the camera parameters including at least one of an extrinsic camera parameter or an intrinsic camera parameter.

13. The non-transitory computer readable storage medium as defined in claim 11, wherein the computer readable instructions are to cause one or more of the at least one programmable circuit to train the convolutional neural network using an L1 loss function.

14. The non-transitory computer readable storage medium as defined in claim 11, wherein the computer readable instructions are to cause one or more of the at least one programmable circuit to train the generative adversarial network using at least one of an L1 loss function, a VGG loss function, or a GAN loss function.

15. The non-transitory computer readable storage medium as defined in claim 11, wherein the computer readable instructions are to cause one or more of the at least one programmable circuit to generate the first synthesized view based on a virtual viewpoint moving trajectory with a sequence of target positions or rotation matrices.

* * * * *